(12) United States Patent
Robbins et al.

(10) Patent No.: US 11,032,298 B1
(45) Date of Patent: *Jun. 8, 2021

(54) SYSTEM AND METHOD FOR CONTINUOUS COLLECTION, ANALYSIS AND REPORTING OF ATTACK PATHS IN A DIRECTORY SERVICES ENVIRONMENT

(71) Applicant: Specter Ops, Inc., Alexandria, VA (US)

(72) Inventors: Andrew Robbins, Alexandria, VA (US); Rohan Vazarkar, Alexandria, VA (US); Ryan William Schroeder, Alexandria, VA (US)

(73) Assignee: Specter Ops, Inc., Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,789

(22) Filed: Jan. 8, 2021

Related U.S. Application Data

(63) Continuation of application No. 16/857,039, filed on Apr. 23, 2020.

(51) Int. Cl.
*H04L 29/06* (2006.01)
*G06F 16/21* (2019.01)

(52) U.S. Cl.
CPC ........ *H04L 63/1416* (2013.01); *G06F 16/212* (2019.01)

(58) Field of Classification Search
CPC .......................... H04L 63/1416; G06F 16/212
See application file for complete search history.

(56) References Cited

U.S. PATENT DOCUMENTS

| | | | | |
|---|---|---|---|---|
| 6,574,737 | B1* | 6/2003 | Kingsford | H04L 63/1433 709/224 |
| 2013/0347116 | A1* | 12/2013 | Flores | H04L 63/1433 726/25 |
| 2015/0172309 | A1* | 6/2015 | Zandani | H04L 63/1466 726/25 |
| 2016/0088000 | A1* | 3/2016 | Siva Kumar | H04L 63/10 726/23 |
| 2017/0302691 | A1* | 10/2017 | Singh | H04L 63/1408 |
| 2019/0124104 | A1* | 4/2019 | Apostolopoulos | G06F 16/9024 |
| 2019/0334928 | A1* | 10/2019 | Sela | G06F 21/552 |
| 2020/0356664 | A1* | 11/2020 | Maor | H04L 63/10 |
| 2020/0358805 | A1* | 11/2020 | Segal | H04L 63/083 |
| 2021/0021629 | A1* | 1/2021 | Dani | H04L 63/1433 |

OTHER PUBLICATIONS

Microsoft Docs, Securing Privileged Access Reference Material, "Active Directory administrative tier model", Feb. 14, 2019, 32 pages. https://docs.microsoft.com/en-us/windows-server/identity/securing-privileged-access/securing-privileged-access-reference-material.
github.com/BloodHoundAD/BloodHound, 2 pages. https://github.com/BloodHoundAD/BloodHound.

* cited by examiner

*Primary Examiner* — Christopher C Harris
(74) *Attorney, Agent, or Firm* — DLA Piper LLP (US)

(57) ABSTRACT

A system and method for analyzing directory service environment attack paths for an enterprise may continuously collect data about the attack paths and provide alerts. The system and method may also analyze the nested object relationships within Directory Services alongside objects at risk for Credential Theft to calculate all possible attack paths within the environment.

24 Claims, 20 Drawing Sheets

300

(Continuous loop)

For When:

Attack Path Edge is discovered which connects Tier 0 Node to any non-Tier 0 Node:

Post to Alert API and send alert, include:

- Description
- Impacted Objects
- Recommended Remediation

FIGURE 4A

SYSTEM AND METHOD FOR CONTINUOUS COLLECTION, ANALYSIS AND REPORTING OF ATTACK PATHS IN A DIRECTORY SERVICES ENVIRONMENT

PRIORITY CLAIMS/RELATED APPLICATIONS

This application is a continuation of and claims priority under 35 USC 120 to U.S. patent application Ser. No. 16/857,039 filed Apr. 23, 2020 and entitled "System and Method for Continuous Collection, Analysis and Reporting of Attack Paths in a Directory Services Environment", the entirety of which is incorporated herein by reference.

APPENDICES

Appendix A (20 pages) contains an example of user data collected by the attack path determining system and method, an example of computer data collected by the attack path determining system and method; an example of group data collected by the attack path determining system and method, an example of domain data collected by the attack path determining system and method, an example of group policy object data collected by the attack path determining system and method and an example of organizational unit data collected by the attack path determining system and method. Appendix A forms part of the specification and incorporated herein.

FIELD

The disclosure relates generally to a system and method for determining attack paths in an enterprise system and in particular to a system and method for collecting, analyzing the reporting attack paths in a directory services environment.

BACKGROUND

Enterprise security teams use Directory Services solutions to manage permissions and access to networked resources. These teams are responsible with ensuring the right assets (users, groups of users, and computers) have just enough access to other assets within the network to complete their job duties but no more. This is critical for two reasons: 1) excessive permissions open paths for malicious actors to operate and execute (that may be known as "Attack Paths") in the pursuit of their objective once gaining initial access within the environment; and 2) excessive permissions increase insider threat risk from users with unnecessary access to sensitive data.

One challenge with Directory Services is the cascading permissions that can be granted to an asset either through nested permissions either directly or indirectly by associating it with another Directory Services asset. This introduces a "Russian Doll" effect of nested permissions that can excessively expose assets within the environment.

Another challenge with Directory Services is the manner in which user credentials or access tokens are stored after accessing other assets within the network. Harvesting, misusing, or hijacking these credentials and tokens (that may be known as "Credential Theft") is trivial for malicious actors who use these to continue to execute lateral movement and complete their objectives.

No solution designed to analyze permissions in Directory Services uses both analysis of token risk with un-nested asset permissions in the calculation of all possible Attack Paths. This leads to a partial and incorrect picture of exposure risk for the environment. Additionally, no system today analyzes all possible Attack Paths in a continuous basis because current solutions focus on point-in-time scans only. The total number of Attack Paths is in a constant state of flux due to daily changes to Directory Services assets (e.g. users added to new groups leading to new nested permissions) and users logging in to other network resources (new Credential Theft risk). Continuous analysis facilitates alerting on an increase in the number of Attack Paths that expose critical assets to compromise.

Finally, no system today presents findings and recommendations from a Tiering Isolation viewpoint. Tiering Isolation is a security and administrative best practice for the management of Directory Services infrastructure. Systems in place today overload administrative and security personnel with generic alerting which do not focus on reducing the total Attack Paths connecting tiered enterprise assets. Proper segmentation of privilege through Tiering Isolation effective cuts the Attack Paths available for compromise and dramatically hardens the network against attackers.

Currently, there is an open source program publicly available from the assignee of the present application called "BloodHound Free and Open-Source" ("BloodHound FOSS") (publicly accessible and available at github.com/BloodHoundAD/BloodHound). BloodHound FOSS is a tool used by ethical hacking professionals who conduct penetration testing or red team operations against corporate client networks. These engagements are designed to emulate attacker activities and complete one or more target objectives to test the security of the environment.

BloodHound FOSS is built to identify a path to a target objective to an authorized ethical hacker. This user will execute BloodHound FOSS to map the available Attack Paths from a computer under his or her control. Once the Attack Graph is populated, the user chooses an Attack Path to pursue and conducts follow-on activities in the pursuit of their target objective. While BloodHound FOSS can identify the available Attack Paths utilizing analysis of both nested relationships and Credential Theft, it does so only from the viewpoint of a single system, is executed as a point-in-time snapshot versus continuous collection and analysis. BloodHound FOSS also is unable to aggregate data collected from multiple sources in an automated manner. BloodHound FOSS only provides the options for users to execute to move to a target objective, it does not provide detailed descriptions of the underlying objects or provide recommendations for defensive mitigation or remediation strategies.

Thus, it is desirable to provide a system and method for continuous collection, analysis and reporting of attack paths in a directory services environment that is not currently provided by the above described existing systems and methods and it is to this end that the disclosure is directed.

BRIEF DESCRIPTION OF THE DRAWINGS

FIGS. 4A and 4B illustrate examples of a rule (implemented in pseudocode) of the alert and the alert user interface, respectively, generated by the alerting engine of the system;

DETAILED DESCRIPTION OF ONE OR MORE EMBODIMENTS

Figure 1:
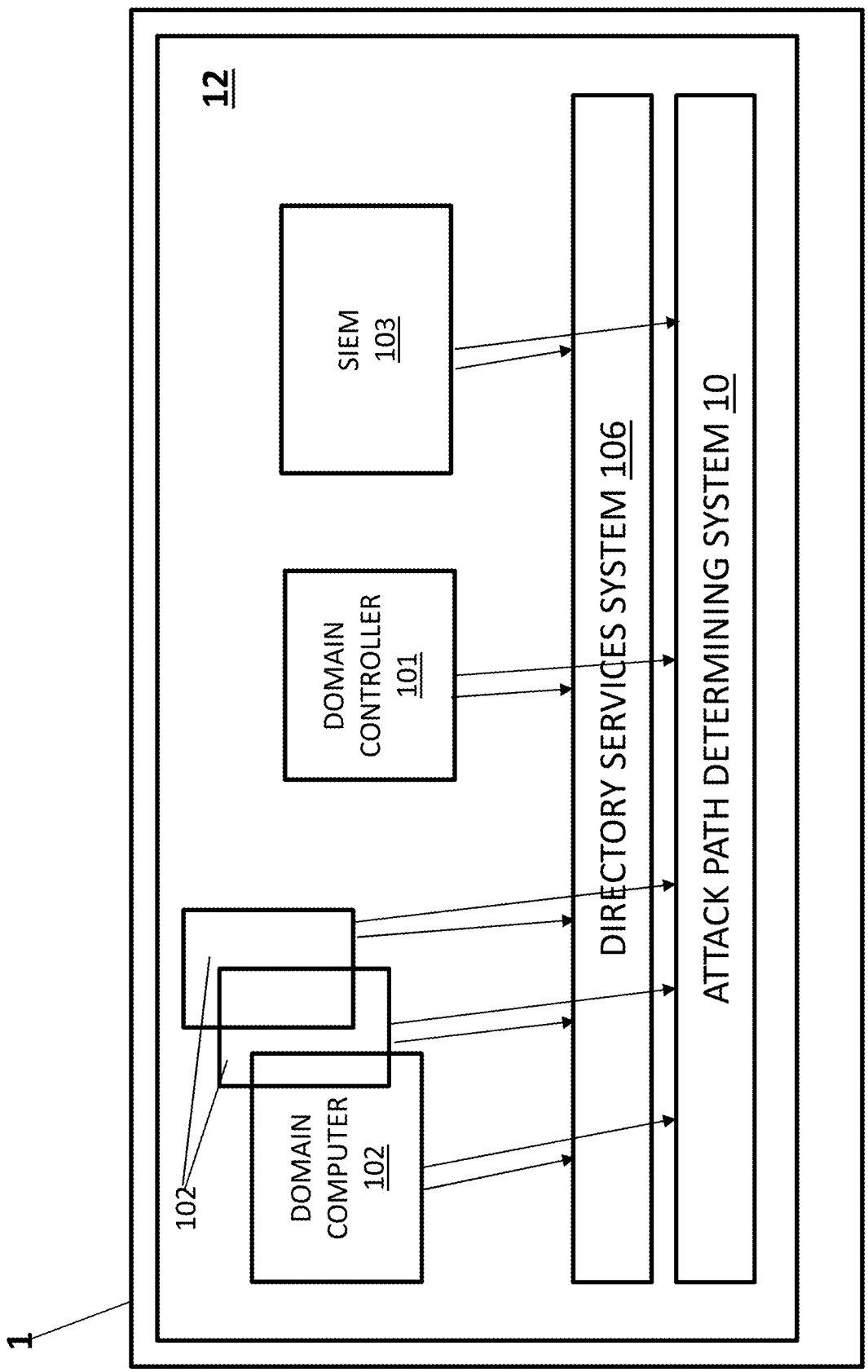
FIG. 1 illustrates an enterprise infrastructure that may be protected by an attack path determining system.

The disclosure is particularly applicable to an enterprise system and method for continuously collecting, analyzing and reporting attack paths for a Microsoft® Active Directory (AD) directory services environment with traditional IT components and it is in this context that the disclosure will be described. It will be appreciated, however, that the system and method has greater utility, such as other Directory Services and or Identity and Access Management (IAM) infrastructures that might have slightly different architectures and/or different or additional IT components all of which are within the scope of this disclosure. For example, the system and method may be used to detect attack paths with any network using any operating system and any directory services system such as Azure® Active Directory and Amazon® Web Services (AWS) IAM.

An embodiment of the system and method for continuously collecting, analyzing and reporting attack paths present in Directory Services may be known as BloodHound Enterprise. The system and method are different than other known systems due to its comprehensive dataset, continuous analysis, and structural presentation in a logical tiered isolation view. Unlike other technologies, the system and method analyzes the nested object relationships within Directory Services alongside objects at risk for Credential Theft to calculate all possible attack paths within the environment. This analysis may be done in a continuous manner beginning with the centralized collection of relevant data sources through a mix of active device interrogation and streaming event collection. These data sources represent the necessary pre-requisite elements which the system ingests into a graph database which is then run through an analytics engine to identify all possible Attack Paths. As Attack Paths are discovered, they can either be served in real-time as a bespoke alert for security personnel or can be grouped by commonality to identify chokepoints within Directory Services tiers that an actor can use to elevate privilege and complete their objective.

These tier privilege chokepoints represent flaws according to security best practices in Privileged Account Management (PAM) models for Directory Services. The most well-known PAM model for Directory Services is Microsoft's "Active Directory Administrative Tier Model" (disclosed and accessible at the following publicly accessible website: docs.microsoft.com/en-us/windows-server/identity/securing-privileged-access/securing-privileged-access-reference-material.) In this model, assets are grouped into three tiers:

Tier 0—the most critical assets and users with power over the entire enterprise

Tier 1—assets and users with control over enterprise servers and applications with significant business value such as a database server containing social security numbers for a health care provider Tier 2—assets and users with control over user workstation and devices such as Help Desk and computer support administrators In this tier structure, it is understood that users and assets within a specific tier should only conduct administrative actions within that specific tier. This is done to protect systems "using a set of buffer zones between full control of the Environment (Tier 0) and the high-risk workstation assets that attackers frequently compromise". However, no system currently exists which allows administrators to understand the Attack Paths that may cross these boundaries either through their faulty implementation of Directory Services permissions or through the login activity of their users. The disclosed system provides Directory Services Administrators with this comprehensive, real-time tiered isolation view of their environment and aggregates the Attack Paths connecting these tiers that violate this PAM model and allow malicious actors to complete their target objective as discussed in more detail below.

Unlike the open source Bloodhound FOSS program that collects data from a single source, perform manual, point in time data collection and presents Attack Paths for users to use in pursuit of a target objective as described above, the disclosed system and method, such as that implemented in the Bloodhound Enterprise embodiment, is different for a number of reasons. First, the disclosed system and method aggregates data from multiple collection points across multiple networks and performs continuous data collection which are not possible using the Bloodhound FOSS program. Furthermore, the disclosed system and method identifies all Attack Paths for the purpose of defensive mitigation and elimination, presents Tiering Isolation Structure for isolating privilege in accordance with security and administrative best practice. groups Attack Paths by common elements, prioritizes Attack Path remediations by impact and severity and provide proactive alerting to highlight newly observed Attack Paths that are also not possible using the Bloodhound FOSS program.

FIG. 1 illustrates an enterprise IT infrastructure 1 that is being protected by an attack path determining system 10. In the example in FIG. 1, the enterprise IT infrastructure 1 may have one or more data centers 12 that house various components of the enterprise IT infrastructure 1 including the attack path determining system 10. The data center may further include one or more directory services system(s) 106. As shown in FIG. 1, each of the components of the enterprise IT infrastructure may be coupled to each of the directory service system(s) 106 and the attack path determining system 10. In one example shown in FIG. 1, the enterprise IT infrastructure 1 may be managed primarily by Microsoft®'s Directory Service "Active Directory" and the infrastructure may include one or more domain computers 102 and one or more domain controllers 101. The domain controller may provide the reference information to delegate rights to the objects within the enterprise IT infrastructure. Each domain computer 102 may hold a record of the applicable delegations for itself as well as any explicit rights. It is also possible that an organization may store similar records from Active Directory within a centralized Security Information and Event Management (SIEM) system 103, such as each record that is written each time a user is added to a group.

One component of the enterprise IT infrastructure, whether on-premise, cloud-hosted, or hybrid environment, is the one or more Directory Services system(s) 106. These are a shared information infrastructure for locating, managing, administering and organizing everyday items and network resources, which can include volumes, folders, files, printers, users, groups, devices of any operating system, telephone numbers and other objects. A directory service (implement by the one or more directory service system(s)) is a critical component of a network operating system and each resource on the network is considered an object by the directory service server that is part of the directory service system 106. Information about a particular resource is stored as a collection of attributes, including which resource has permissions to perform particular actions, such as accessing, deleting or modifying the resource amongst others, or are associated with that resource or object. This information can be stored centrally by the Directory Services system 106 itself or within the Directory Services resources or objects directly.

One of the duties performed by Directory Services is to dictate which resources have access to other resources. For example, Directory services may specify that the "HelpDesk" user group has the ability to modify the passwords of users within the environment in order to facilitate regular operations within the organization. Similarly, the "Finance" group may be granted the right to access a certain group of files "Taxes" within a "Finance Servers" enclave to both support the access requirements to complete a task but also to block other, non-Finance users from accessing sensitive information. Thus, Directory Services grants or denies access rights to a resource for various actions.

Directory Services rights may be explicitly granted or delegated. For example, an administrator may define, within the Directory Services Server or instance, the user group for "Finance". This group may include all the relevant employees within the Finance organization. Next, the Administrator may define the group of machines "Finance Servers" which the organization utilizes. The Administrator may define a right for the "Finance" group to have access to the "Finance Servers". Therefore, any new user added to "Finance" would be automatically granted the rights to the resources he or she may need to complete their regular duties. This is an example of a delegated right that is inherited due to the other rights in the Directory Services system.

Similarly, the Directory Services rights can be explicitly granted through individual systems. For example, "Jim", a member of the "Legal" group, may temporarily or permanently require the need to access information hosted within a system which is grouped under "Finance Servers". This individual does not belong to the user group for "Finance" and would not automatically be granted the inherited rights to complete their task. In this instance, the administrator may choose to modify the local access rights within the server named "FINSERV0001" located within "Finance Servers" and grant "Jim" access rights. This is an example of an explicitly granted right.

It is important to note that rights that were granted explicitly may or may not be represented by the Directory Services server but rather within the individual systems or objects under which this right was granted. In other words, the Directory Services server may not be aware that "Jim" has rights to "FINSERV0001" when, in fact, he does have access rights to that system.

Figure 5:
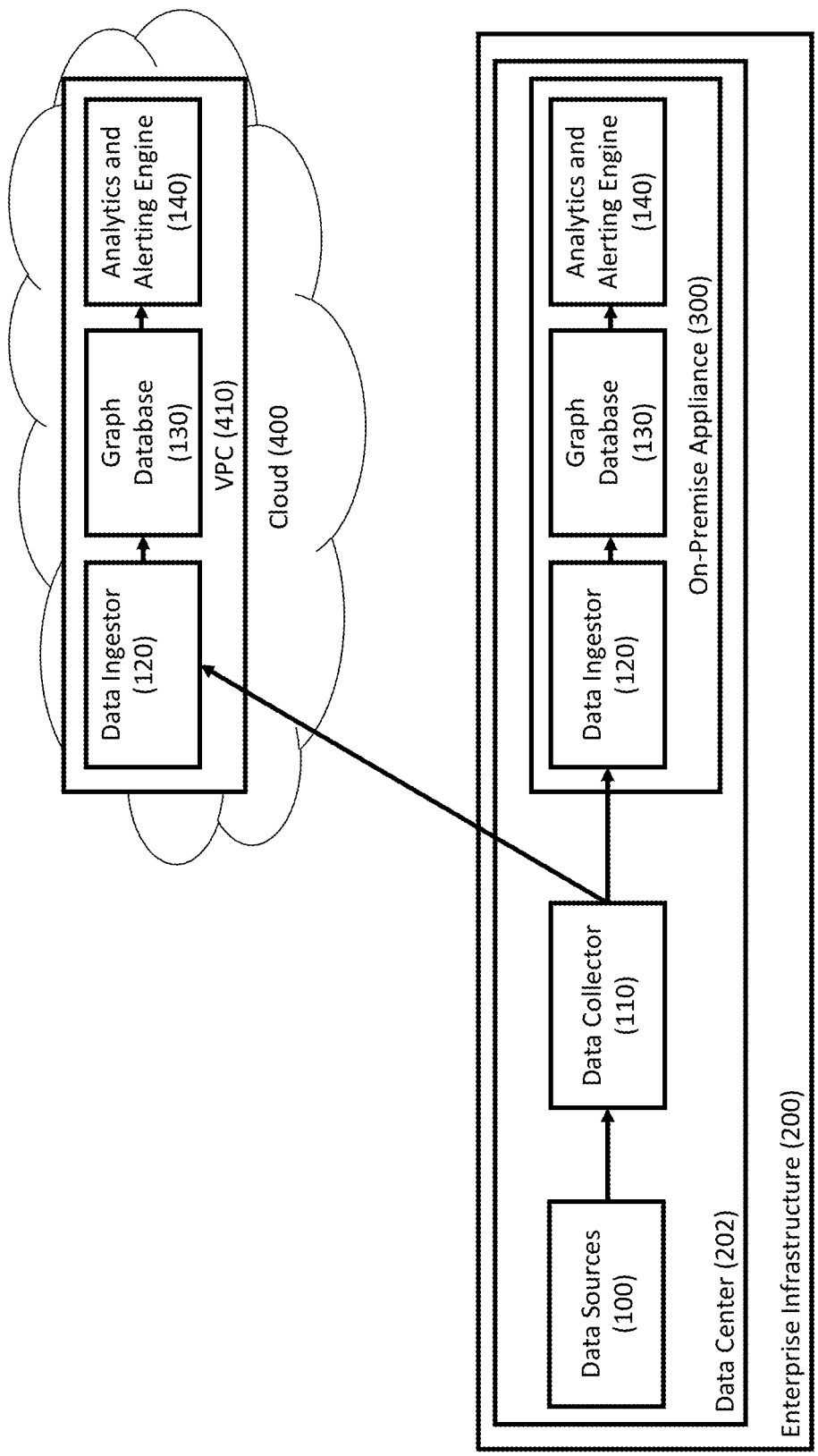
FIG. 5 illustrates the embodiment of the BloodHound Enterprise systems conducted as an on-premise physical/virtual appliance or systems running within a cloud.

The attack path determining system 10 shown in FIG. 1 gathers information continuously from the elements 102-103 and the Directory Services system 106 and determines attack paths that may exist due to the various access rights granted explicitly or delegated and generates alerts, etc. to notify an administrator of the attack paths. For example, a new access grant may be made in the network that, due to delegated rights, opens up an attack path that can determined by the attack path determining system 10. The one or more Directory Services system(s) 106 may be implemented as one or more server computers that have a processor and memory and instructions stored in the memory that may be executed by the processor to perform the Directory Services operations, including the grant or withdrawl of access rights for a resource. The attack path determining system 10 may be implemented in software (instructions being executed by a processor that is part of a computer system of the network or its own computer system as shown in FIG. 1, or a cloud computer resource as shown in FIG. 5 that performs the operations/processes of the attack path determining system as described below. Alternatively, the attack path determining system 10 may be implemented in hardware, such as the appliance shown in FIG. 3 or any other piece of hardware that can implement the various operations/processes of the attack path determining system as described below.

Figure 2:
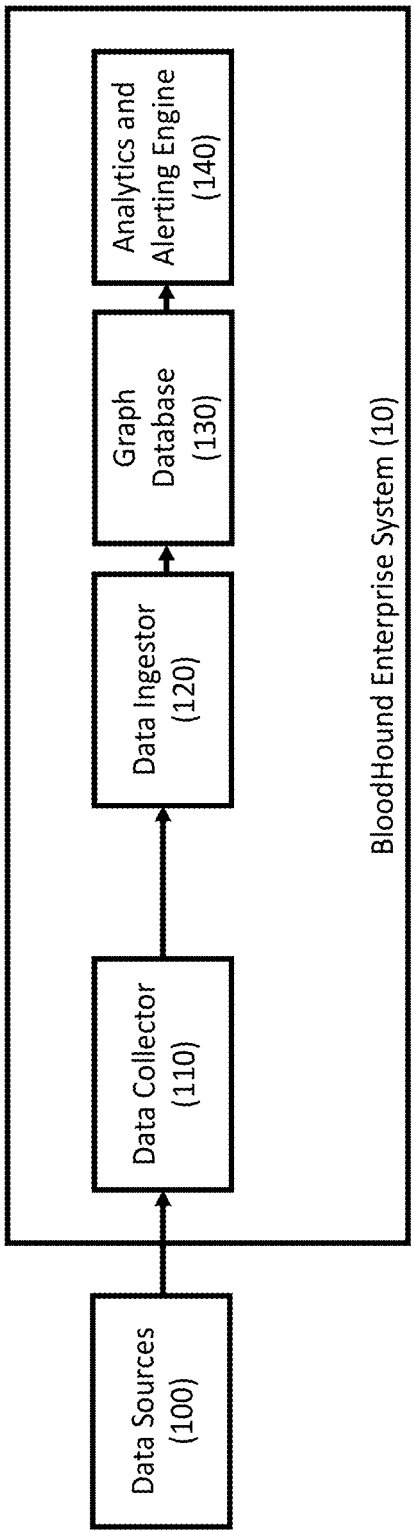
FIG. 2 illustrates an embodiment of the attack path determining system, implemented as a BloodHound Enterprise system and its major components.

FIG. 2 illustrates an embodiment of the continuous attack path determining system 10, with the embodiment being an implementation of a BloodHound Enterprise system, and major components. Each element of the system 10 shown in FIG. 2 may be implemented as a plurality of lines of instructions/computer code that are executed by a processor of the system 100 to implement the functions of each element in FIG. 2. Alternatively, each element may be implemented as a hardware device (integrated circuit, ASIC, state machine, appliance shown in FIG. 5, etc.). In some embodiments, one or more of the elements may be integrated into a computer system with a processor.

Figure 3A:
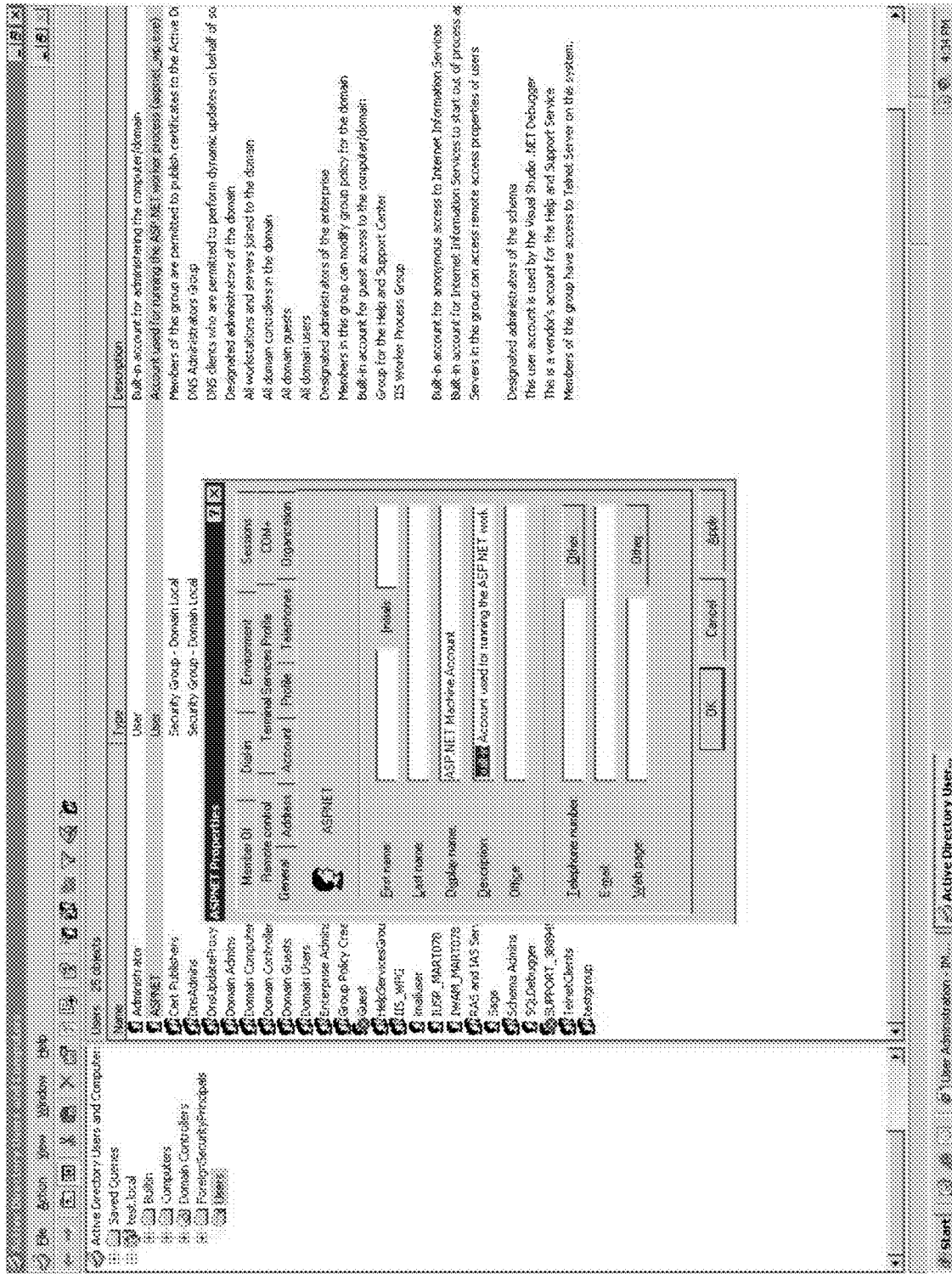
FIGS. 3A and 3B illustrate examples of the active directory data and local group data that may be part of the data continuously gathered from the data sources.
Figure 3B:
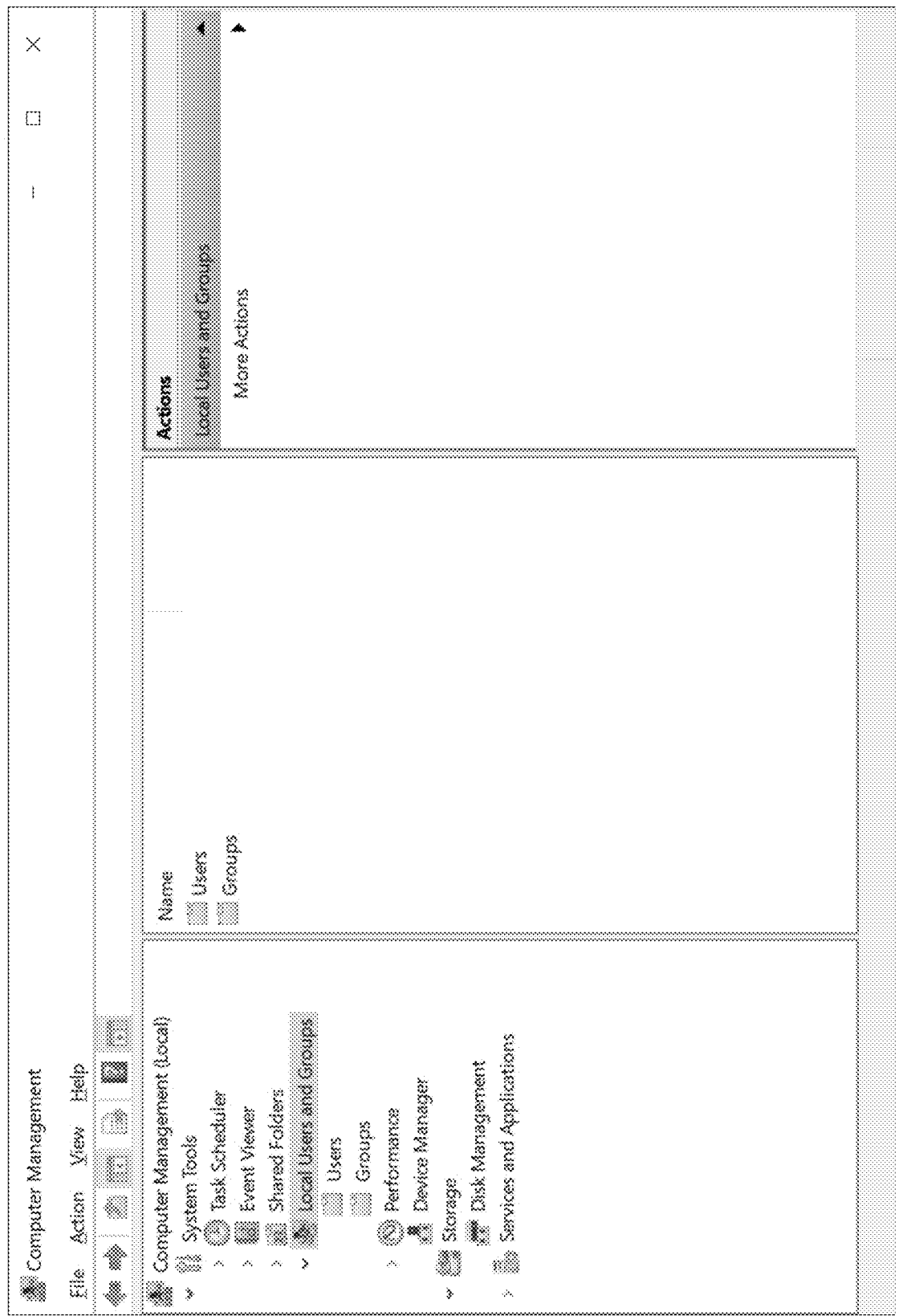
Figure 17:
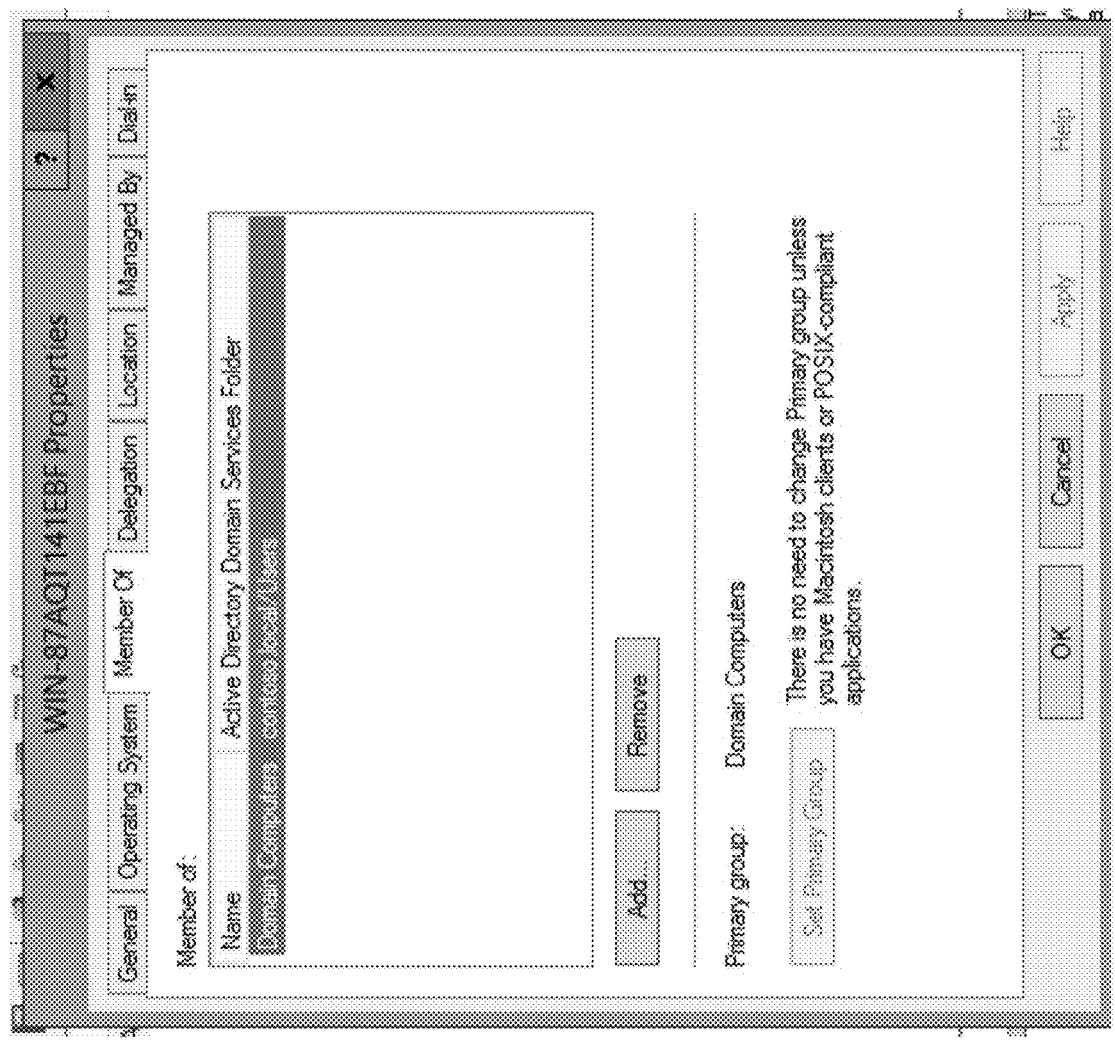
FIG. 17 illustrates an example of a computer "Member of" user interface showing the data.
Figure 18:
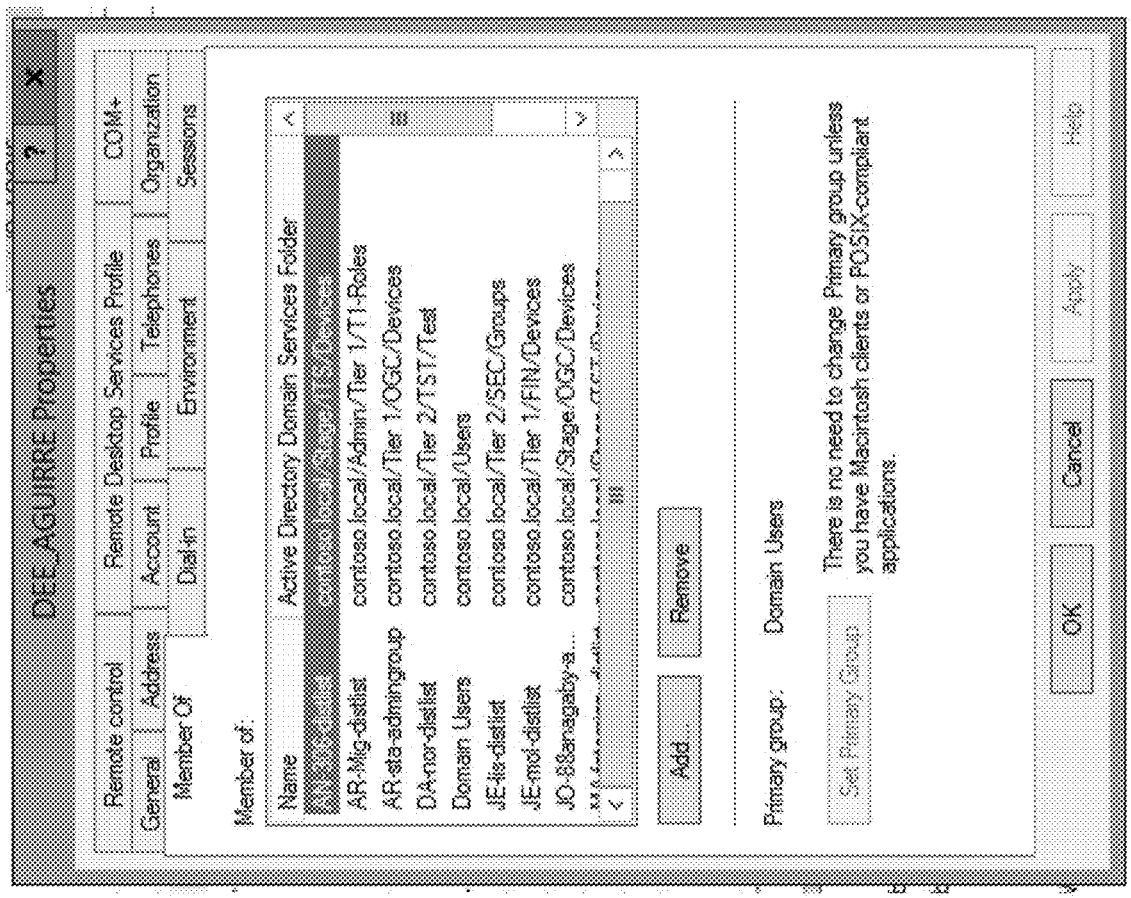
FIG. 18 illustrates an example of a user "Member of" user interface showing the data.

The attack path determining system 10 may include a Data Collector 110, which may be run as a Virtual Machine (VM), Container, or as services on top of any base Operating systems (OS) and collects relevant data from one or more data sources 100 which reside within an environment that includes the system 10. For example, each of the one or more domain computers 102, the domain controller 101 and the centralized Security Information and Event Management (SIEM) system 103 shown in FIG. 1 may be a data source 100 that provides data to the data collector 110. FIGS. 3A and 3B illustrate examples of the active directory data and local group data that may be part of the data continuously gathered from the data sources. FIG. 3A shows the data fields and data that are contained in directory services data, the active directory system in this example, for each component of the network, such as the permissions for actions and the MEMBER OF data that may indicate the delegated rights for that component of the network. FIG. 17 shows an example of a computer "Member of" user interface and the data while FIG. 18 shows an example of a user "Member of" user interface and its data.

FIG. 3B illustrates an example of the fact that the directory services data that is continuously collected may include local user and groups data about the permissions, both explicit and delegated. These Data Sources 100 may have their data continuously collected by the Data Collector 110 through active interrogation of other systems within the environment, through passive collection of streaming data sent by another system, or a hybrid of the two before standardizing the output format, such as into a JSON format, and shipping to a Data Ingestor 120. The Data Ingestor 120 then receives standardized data before loading this data within a Graph Database 130 In one embodiment, the data ingestor 120 may be/include an application programming interface (API) that takes the data and loads it into the database.

The graph database 130 is a known type of database that has nodes and edges that are used to store data and the relationships between the data. In the system 10 in FIGS. 1-2, the graph database 130 may be used to store the Directory Services objects (nodes) and their connecting relationships (edges). For example, this database may identify and store the user "Jane" (object) who is a member of (edge) the "Finance" group (object). Another record lists that the "Finance" group (node) can access (edge) the computers within the "Finance Servers" machine group. This is similar to the method popular mapping software, such as Google Maps, that stores destinations (nodes) and roads (edges) in order to serve directions between two locations.

An Analytics and Alerting Engine 140 extracts data/ queries data/requests data from the graph database 130. The Analytics and Alerting Engine 140 may then run a set of analysis across the Graph Database 130 either in continuous or batch processes which can generate alerts and intelligence that may be surfaced to a Directory Services Administrator, Information Security Representative, or others.

FIG. 4A illustrates an example a rule 300 in pseudocode that the Analytics and Alerting Engine 140 uses to generate an alert. Note that the FIG. 4A is only one example of the pseudocode that implements a rule to generate the alert. Thus, the Analytics and Alerting Engine 140 may have a set of a plurality of rules, each with different triggers and data inputs that generate the alert, wherein each of the set of rules is continuously executed to determine if a directory services attack path is identified.

An example of the set of rules are now described. The set of rules may be categorized such that each rule identifies a particular attack path and has a recommended solution to the identified particular attack path. For example, the set of rules may have a plurality of rules that identify: 1) attack path to Tier 0 assets in a network; 2) abuseable Kerberos configurations; 3) Least Privilege Enforcement and Privileged Account Management, etc. The plurality of rules for identifying attack path to Tier 0 assets each seek to remove those attack paths to Tier 0 assets in the enterprise network. Each rule for attack path to Tier 0 assets may have a different remediation of the problem. For example, one rule may restrict Tier 0 User Account Logons, another rule may remove Users and Groups from Local Groups on Tier 0 Computers, another rules may restrict Control of Group Policy Objects (GPOs) that Apply to Tier 0 Assets and another rule may restrict Control of Tier 0 Objects.

The plurality of rules for identifying abuseable Kerberos configurations each seek to resolve these configuration problems so that an attacker cannot use those configurations maliciously and gain improper access to assets of the network. Each rule for abuseable Kerberos configurations may have a different remediation of the problem. For example, one rule may harden or remediate Kerberoastable User Accounts, another rule may address Computers Trusted for Unconstrained Delegation and another rule may restrict Control of Computers Trusted for Unconstrained Delegation. A computer trusted for unconstrained delegation means that the asset has trust to delegate access to any service.

The plurality of rules for identifying least privilege enforcement and privileged account management seek to resolve these issues by limiting the access rights for each asset to a minimum required access privilege. Each rule for least privilege enforcement may have a different solution. For example, one rule may trim Execution Rights Held by Large Security Groups and another rules may audit Potential Vulnerable Account Passwords, such as password that do not have strong passwords.

As shown in FIG. 4A, each rule may be continuously evaluated based on a set of triggers based on the collected directory services data, such as "Attack Path Edge is discovered which connects Tier 0 Node to any non-Tier 0 Node". Note that each rule is written to take advantage of the way in which the continuous directory services data is stored in the graph database 130. The rule may then have alert process, such as "Post to Alert API and send alert, include: Description, Impacted Objects and Recommended Remediation" as shown in FIG. 4A that is executed when the particular rule is satisfied.

Figure 4B:
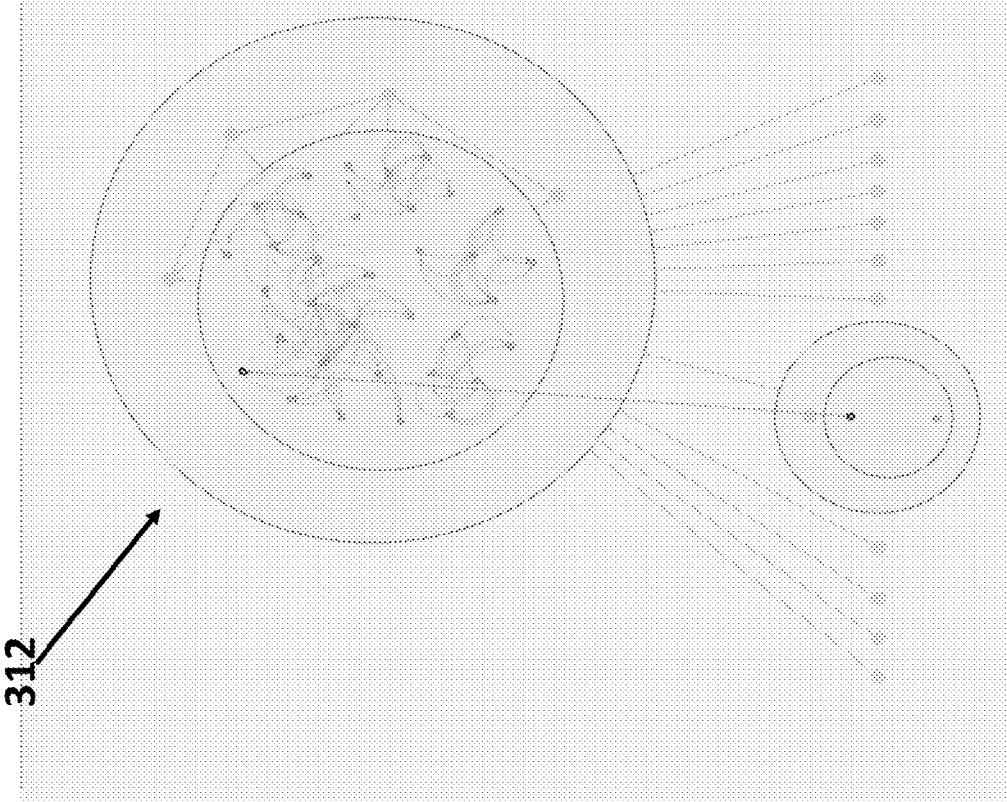

FIG. 4B illustrate an example of the alert 310 that is generated based on a triggered rule, such as rule 300 shown in FIG. 4A based on the exemplary directory services data shown in FIGS. 9-16 and described below. As shown in FIG. 4B, the alert 310 may include a graphical representation 312 of the problem that in this example may be "Attack Path Edge is discovered which connects Tier 0 Node to any non-Tier 0 Node" and a narrative 314 that contains a recommended solution ("remove Tier 1 assets from the Local Administrator Groups on Tier 0 assets" in this example), a description of the problem, some further recommendations about the problem and supporting data in the form of graphs, charts, or other visual aides to facilitate prioritization and impact analysis for the user. As shown in FIGS. 9-16, this alert may present detailed findings specific to the single Attack Path Edge 640 which is connecting one Attack Path Element 620 to another in a higher or lower tier. The alerts may also summarize and group findings by Attack Path Aggregated Edge 611 and present supporting data in the form of graphs, charts, or other visual aides to facilitate prioritization and impact analysis for the user.

FIG. 5 illustrates the embodiment of the BloodHound Enterprise systems executed as an on-premise physical/ virtual Appliance 300 or systems executed within a Cloud (400) environment. In this example, the On-Premise Appliance 300 is running within a Data Center 202 which is part of an Enterprise Infrastructure 200. The Data Sources 100 in the enterprise infrastructure 200 are collected by the Data Collector 110 before transmission to the On-Premise Appliance 300 for the remainder of the BloodHound Enterprise System 10 to consume and execute. Alternatively, the Data Collector may upload data via a Transport Layer Security (TLS) tunnel to a BloodHound Enterprise System 10 within a Cloud 400 environment. Here, standardized data from that specific Enterprise Infrastructure 200 is analyzed by this BloodHound System 10 which may house the Data Ingestor 120, Graph Database 130, and Analytics and Alerting Engine 140 under a full enclosed Virtual Private Cloud (VPC) 410. Thus, as shown in FIGS. 2 and 3, the system 10 for determining attack paths can be implemented in various different architectures all of which are within the scope of the disclosure.

Figure 6:
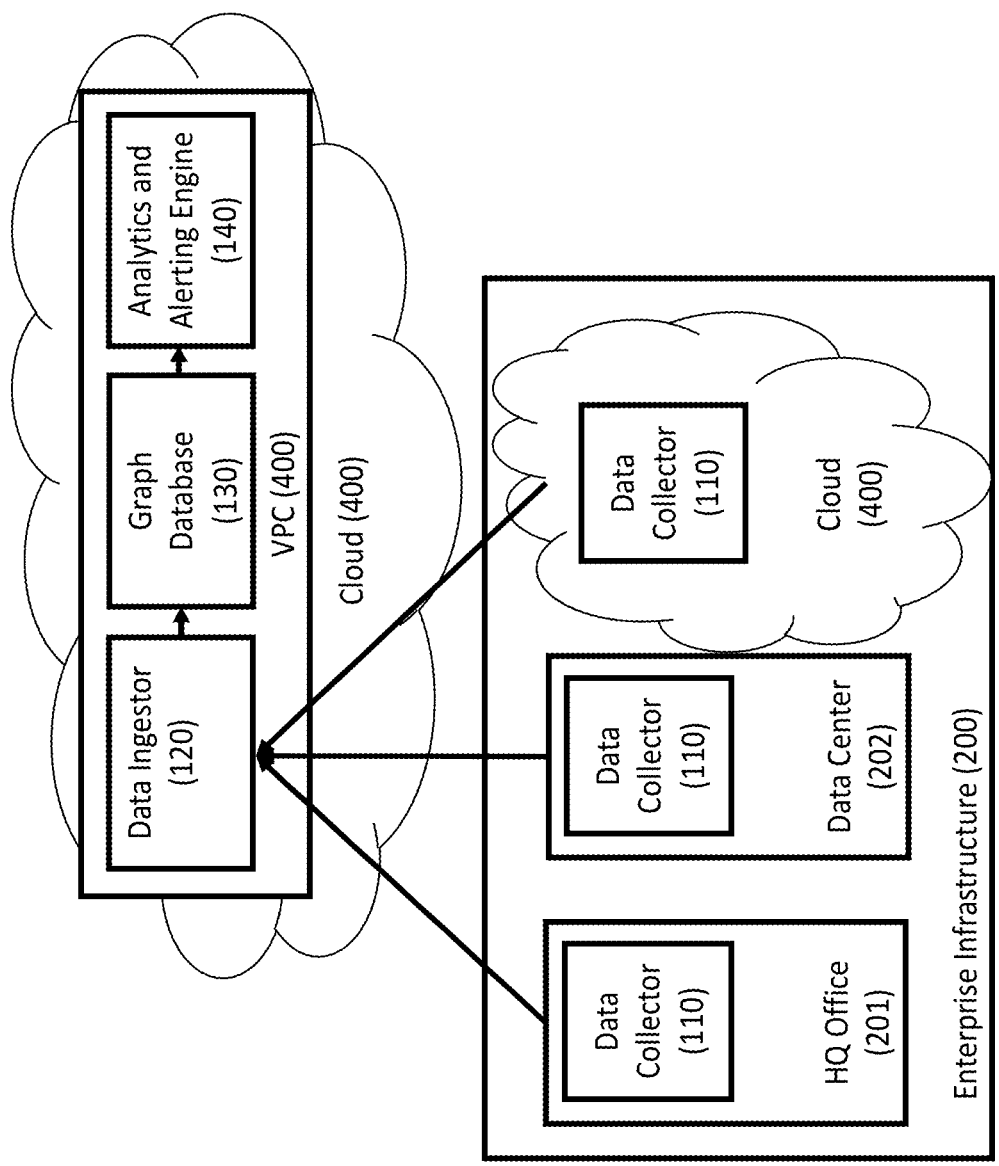
FIG. 6 illustrates the system collecting data from multiple enterprise sources with centralized ingestion.

FIG. 6 illustrates another embodiment of the system 10 in which system is collecting data from multiple enterprise sources with centralized ingestion, rule analysis and alerts. In this example, one or more Data Collector(s) 110 are located throughout the Enterprise Infrastructure 200. In the example in FIG. 6, these locations may include a HeadQuarters (HQ) Office 201, a datacenter 202, or within a public or private Cloud 400 each housing other enterprise systems. These Data Collector(s) 110 use TLS tunnels to upload data to a centralized attack path determining sub-system that may be housed in a virtual private cloud 400 in the cloud 400 (that may be the same cloud 400 that houses a portion of the enterprise infrastructure 200 or a different cloud 400). The centralized attack path determining sub-system may include a centralized Data Ingestor 120 to allow for BloodHound Enterprise system 10 to conduct analysis across separated environments in aggregate. In this example, the other elements of the system 10 (the data ingestor 120, the graph database 130 and the analytics and alerting engine 140) may be remotely located from the one or more data collectors 110, but all operate in the same manner as already described above.

Figure 4B:
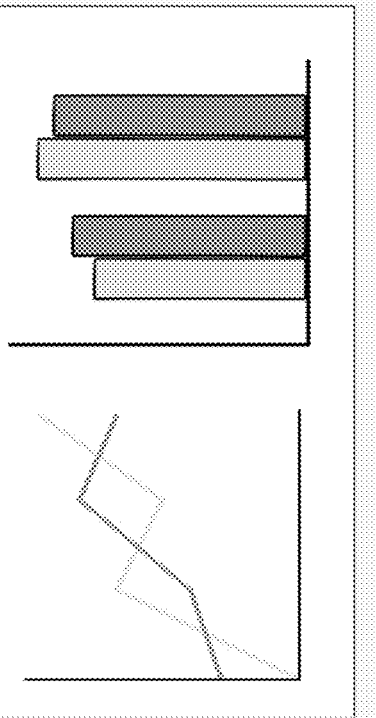
Figure 7:
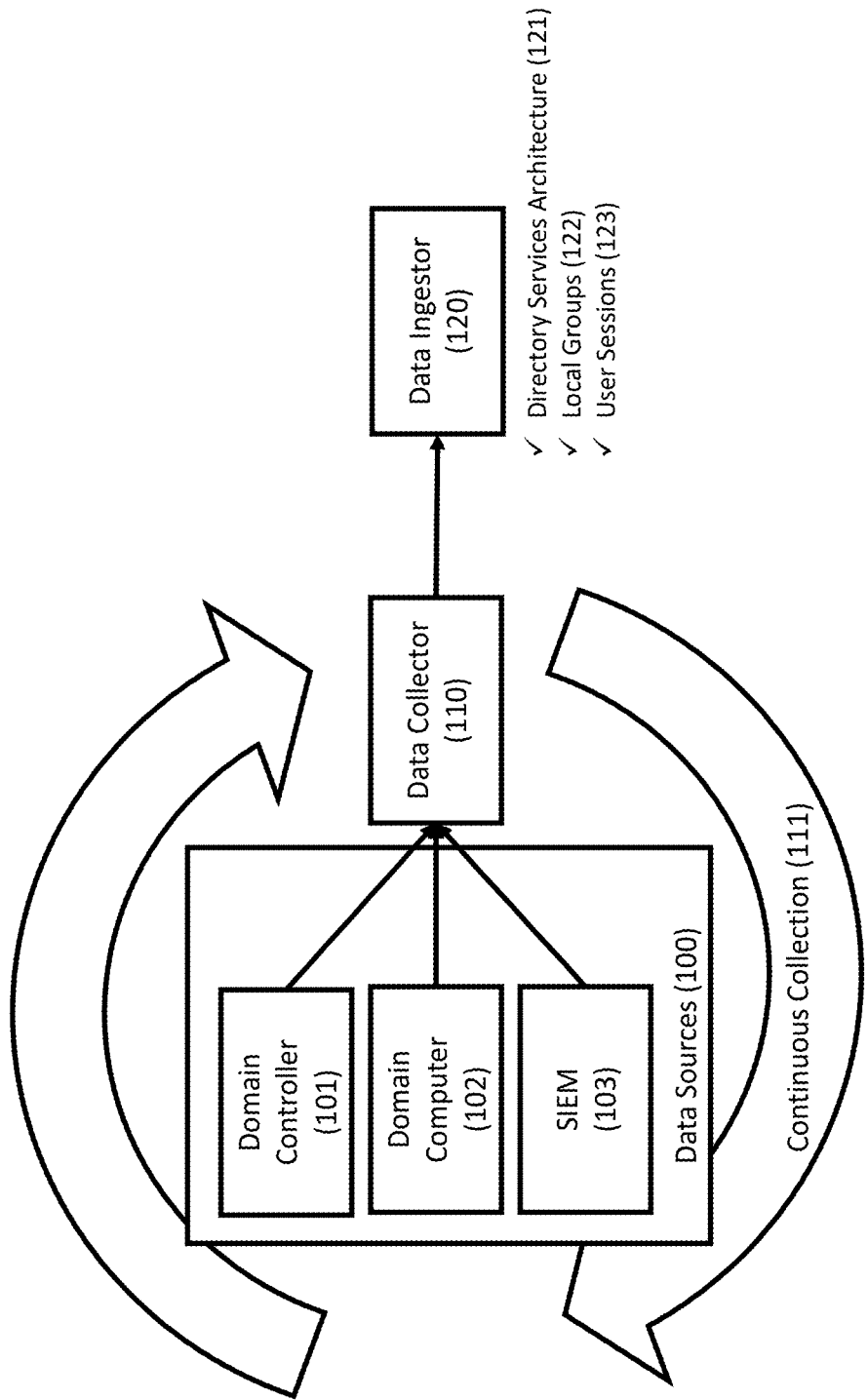
FIG. 7 illustrates the continuous collection of data sources for ingestion.

FIG. 7 illustrates the continuous collection of Data Sources 100 by the Data Collector 110 in any of the different embodiments of the system 10 shown in FIGS. 1, 2, 5 and 6. Conventional systems and methods collect data snap shots whereas the disclosed system and method 10 may continuously collect (process 111) the data that is not done by conventional systems. The Data Sources 100 shown in FIG. 4 may include the active interrogation of one or more Domain Controller(s) 101, the active interrogation of Domain Computer(s) 102, or the passive collection of streaming log records which may be pushed by a centralized Security Information and Event Management (SIEM) system 103. This continuous collection may be executed in real-time, as part of a scheduled batch operation, or some combination of the two to gain a comprehensive dataset. These standardized records are then collected by the Data Ingestor 120 which may organize them into major categories such as the overall Structure of the Directory Services installation 121, details regarding the Local Group 122 permissions specific to each system, or recent and active individual User Sessions 123 specific to each system, amongst others as described above with reference to FIGS. 3A-3B.

Figure 8:
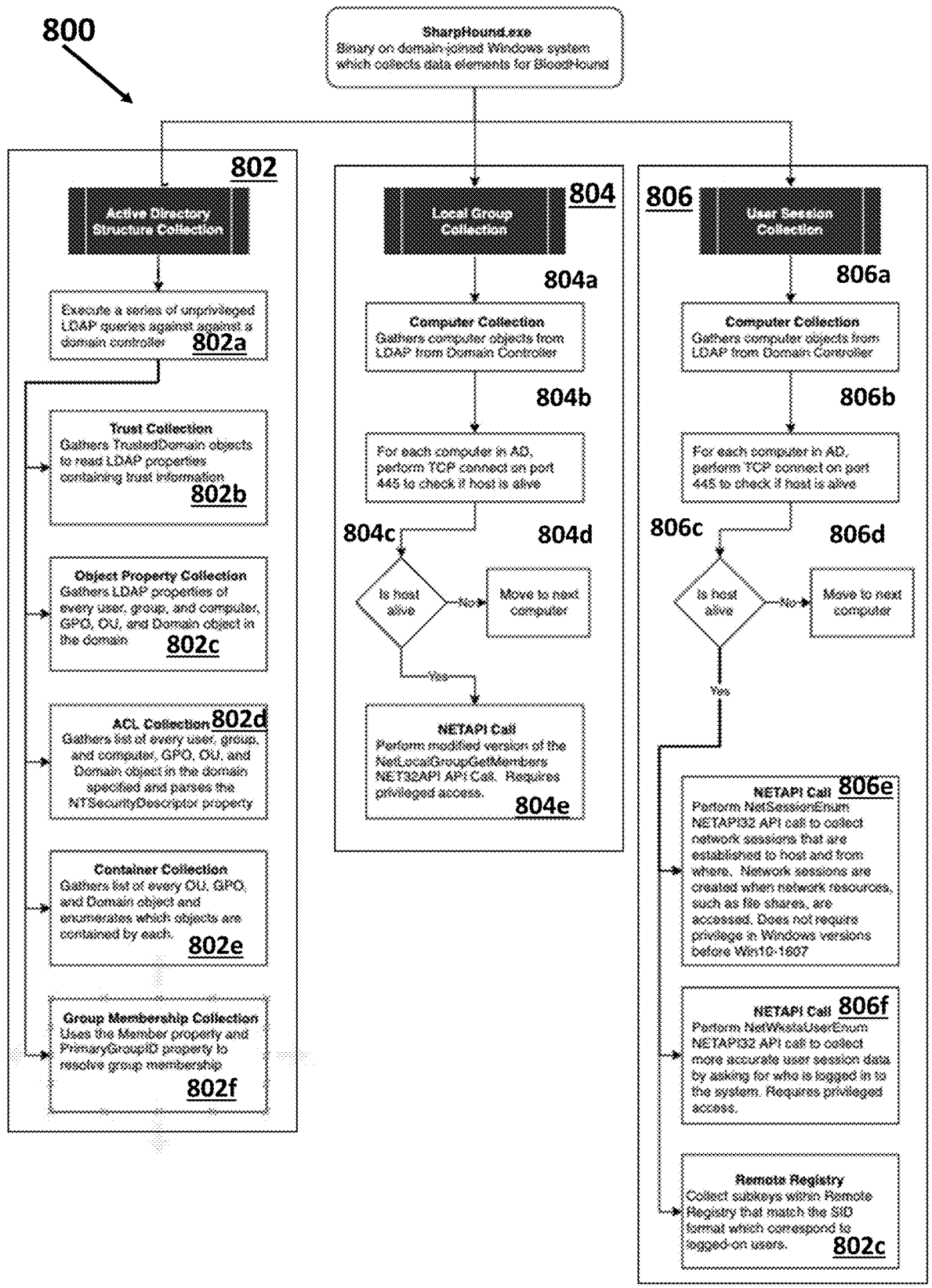
FIG. 8 is a flowchart showing more details of the continuous data collection process.

FIG. 8 is a flowchart showing more details of the continuous data collection process 800 that may be performed by the data collectors 110 of the system 10. The method sort forth in FIG. 8 may also be performed by other systems/computer systems, etc. The data collection process 800 may include three processes being performed simultaneously including an active directory structure collection 802, a local group collection 804 and a user session collection 806. The active directory structure collection 802 may start by executing (802a) a series of unprivileged LDAP queries against a domain controller. The process may also perform a trust collection (802b) in which the process gathers TrustedDomain objects to read LDAP properties containing trust information and an object property collection (802c) that gather LDAP properties of every group and user and computer, GPO, Organizational Units (OU) and domain objects in the domain. The process may also perform ACL collection (802d) that gathers lists of every user, group and computer, GPO, OU and domain object in the particular domain and parses the NTSecurityDescriptor Property. The process 802 may also collect containers (802e) that gathers a list of every OU, GPO and domain object and enumerates which objects are contained by each. The process 802 may also perform a group membership collection (802f) that uses the Member property and PrimaryGroupID property to resolve group membership. For example, continuing the example above, this process may automatically determine the users/computer that are members of the Finance group.

The local group collection process 804 may perform a computer collection (804a) that gathers computer objects from LDAP from the domain controller. The process 804 may, for each computer in the active directory gathered above, perform a TCP connect on port 445 to check if the host is alive (804b, 804c). If the host is not alive, the method moves to the next computer (804d) and restarts this process 804 at the top. If the host is alive, the method 804 may perform a NETAPI call (804e) that is a modified version of the NetLocalGroupGetMembers NET32API call and requires privileged access. The method is completed when all of the computers are analyzed. Examples of the various types of data collected by the method 800 shown in FIG. 8 are contained in Appendix A that incorporated herein.

The user session collection method 806 may perform a computer collection (806a) that gathers computer objects from LDAP from the domain controller for each user. The process 806 may, for each computer in the active directory gathered above, perform a TCP connect on port 445 to check if the host is alive (806b, 806c). If the host is not alive, the method moves to the next computer (806d) and restarts this process 806 at the top. If the host is alive, the method 806 performs a NETAPI call that is a NetSessionEnum NET32 API call (806e) to collect network sessions that are established to host and from where the network sessions are created when network resources, such as file shares, are accessed. The method 806 may perform another NETAPI call (806f) that is a NetWkstaUserEnum NET32 API call to collect more accurate user session data by asking for who is logged in to the system which requires privileged access. The method 806 may then perform a remote registry process (806g) that collects subkeys within a remote registry that match the SID format and corresponds to logged on user. The method is completed when all of the computers are analyzed.

Examples of Attack Path Determinination and Alerting

To illustrate the operation of the attack path determining system and method is more detail, an example of the process using an example situation in the network will now be described.

Figure 9:
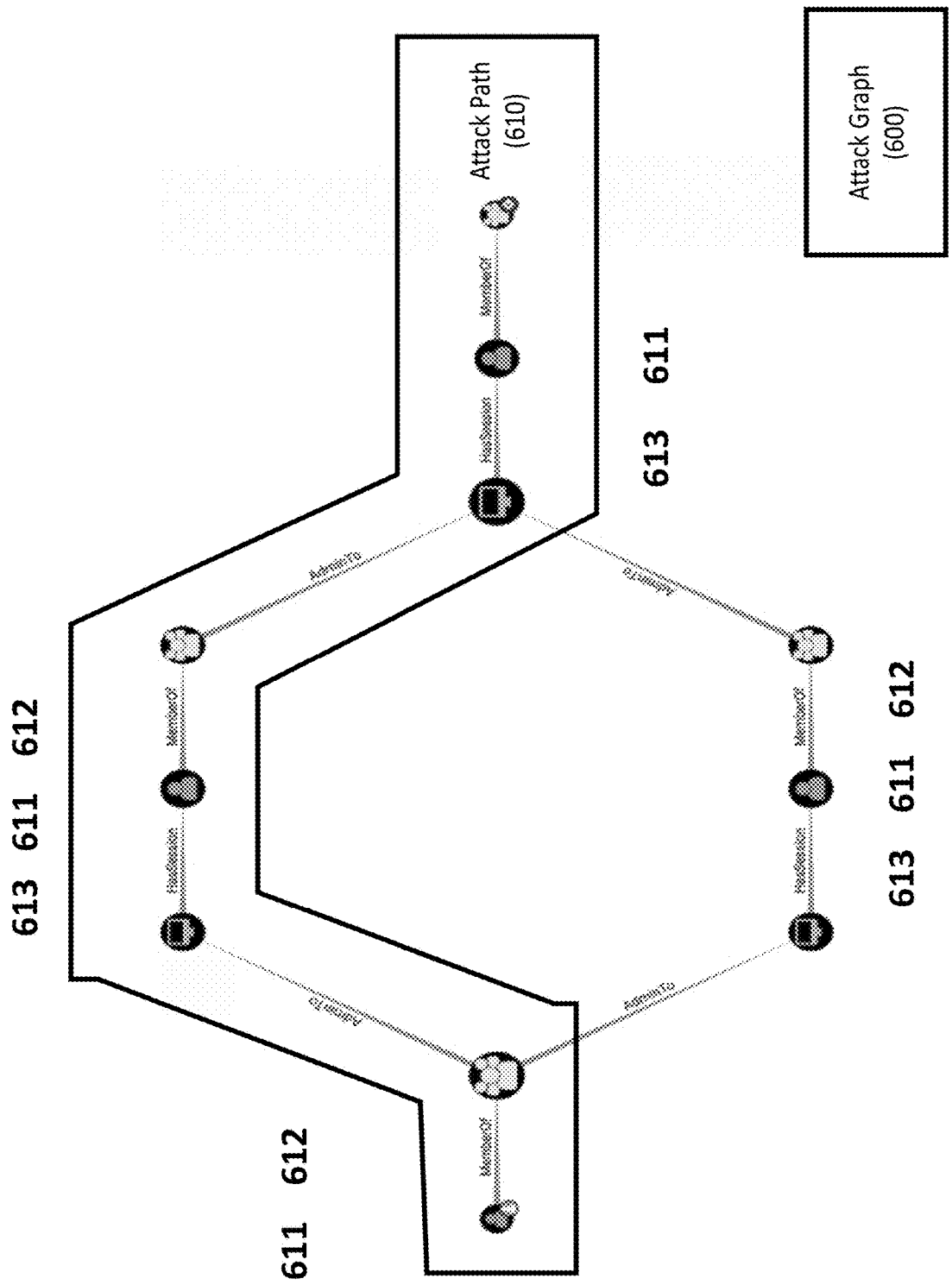
FIG. 9 illustrates the Attack Graph and identifies one Attack Path.
Figure 10:
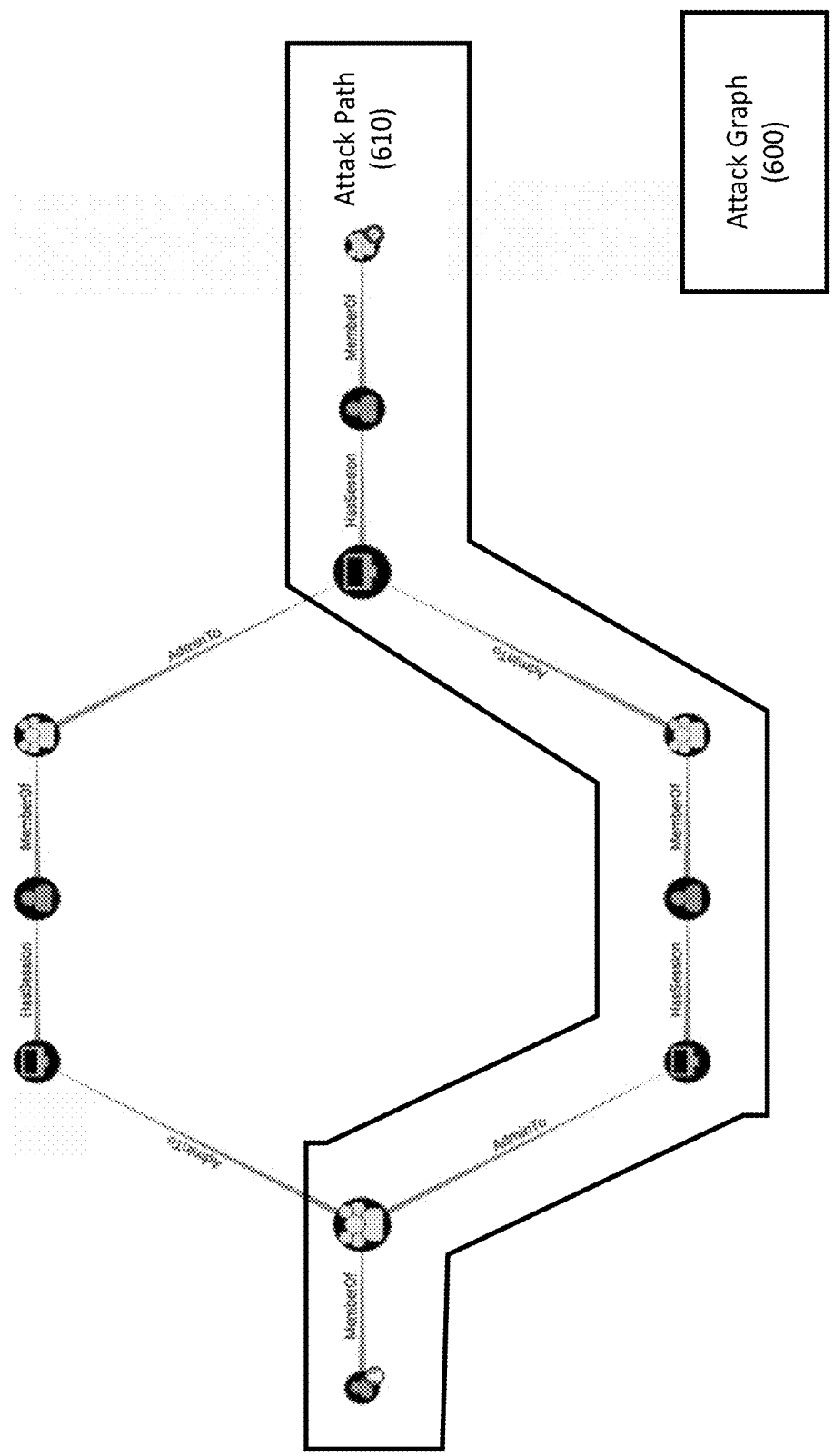
FIG. 10 illustrates the same Attack Graph and identifies an alternative Attack Path.

FIG. 9 illustrates an example of an Attack Graph 600 and highlights an available Attack Path 610. FIG. 10 Illustrates the same Attack Graph 600 but highlights a different Attack Path 610 because enterprise Infrastructures 200 contain any number of computers and users which may have access granted via Directory Services to perform any number of actions including accessing remote shares, making changes to underlying system configurations, or others. In the example in FIG. 9 or 10, the graph shows the permissions granted and then an unintended attack path 610 due to the permissions granted. These granted permissions and logins are represented by Attack Path Elements 620 and Attack Path Edges 640 which combine to create Attack Paths 610 which can be executed by a malicious actor.

Figure 11:
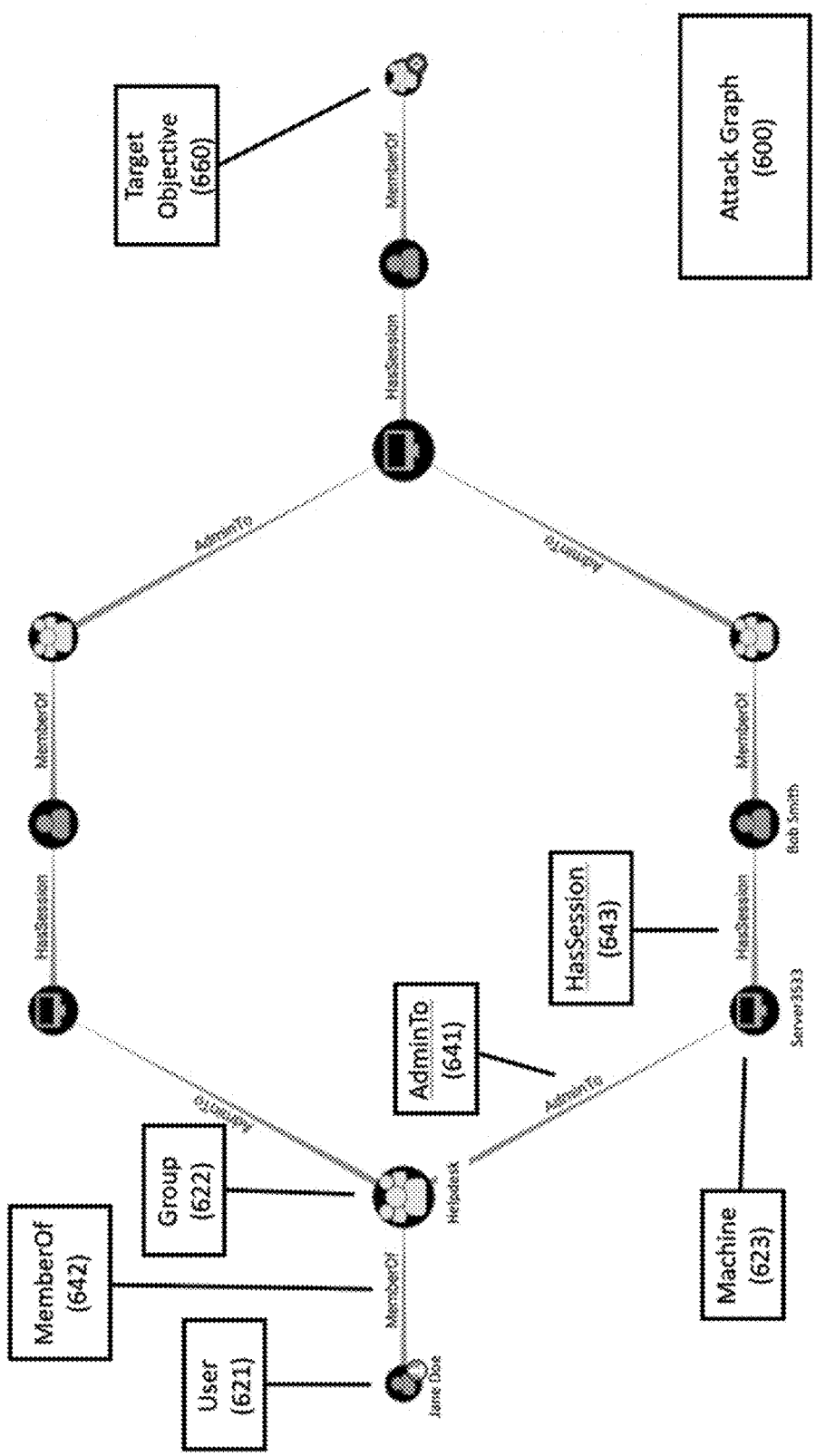
FIG. 11 illustrates a few elements that can create an Attack Path.

FIG. 11 illustrates the a few of the relationships that may introduce an Attack Path 610. In this illustration, the Attack Graph 600 contains two separate Attack Paths 610 which are comprised of Attack Path Elements 620, also known as nodes. These nodes can include, but are not limited to: Users 621, Groups 622 (groups of one or more users), Machines (computers, servers, etc.) 623, Group Policy Objects 624, Domains 625, and Organizational Units 626. These Attack Path Elements 620 are connected by Attack Path Edges 640 which can include but are not limited to: AdminTo 641, MemberOf 642, HasSession 643. In this example, the Target Objective 660 is a group of highly privileged users within the environment. The malicious actor can take two separate Attack Paths 610 to complete the Target Objective 660. This begins first with a User 621 "Jane Doe" who belongs to the "Helpdesk" Group 622 which is represented by the MemberOf 642 edge. The Helpdesk Group 622 has administrative control over the Server 623 labeled "Server 3533" which is represented by the AdminTo 641 edge. This Server 623 has a User Session 123 for another User 621 "Bob Smith" which is represented by the HasSession 643 edge.

In this example in FIG. 11, the malicious actor only needs to have access to the User 621 "Jane Doe" to begin executing his or her attack. As a member of the HelpDesk Group 622, the malicious actor can use the account for "Jane Doe" to access "Server 3533" and execute Credential Theft 700 operations to gain access for the account of "Bob Smith". The Attack Path 610 then continues as "Bob Smith" is part of another Group 622 which has administrative control over another Machine 623 which has another session for a User 621 which is grants access to the Target Objective 660.

Figure 12:
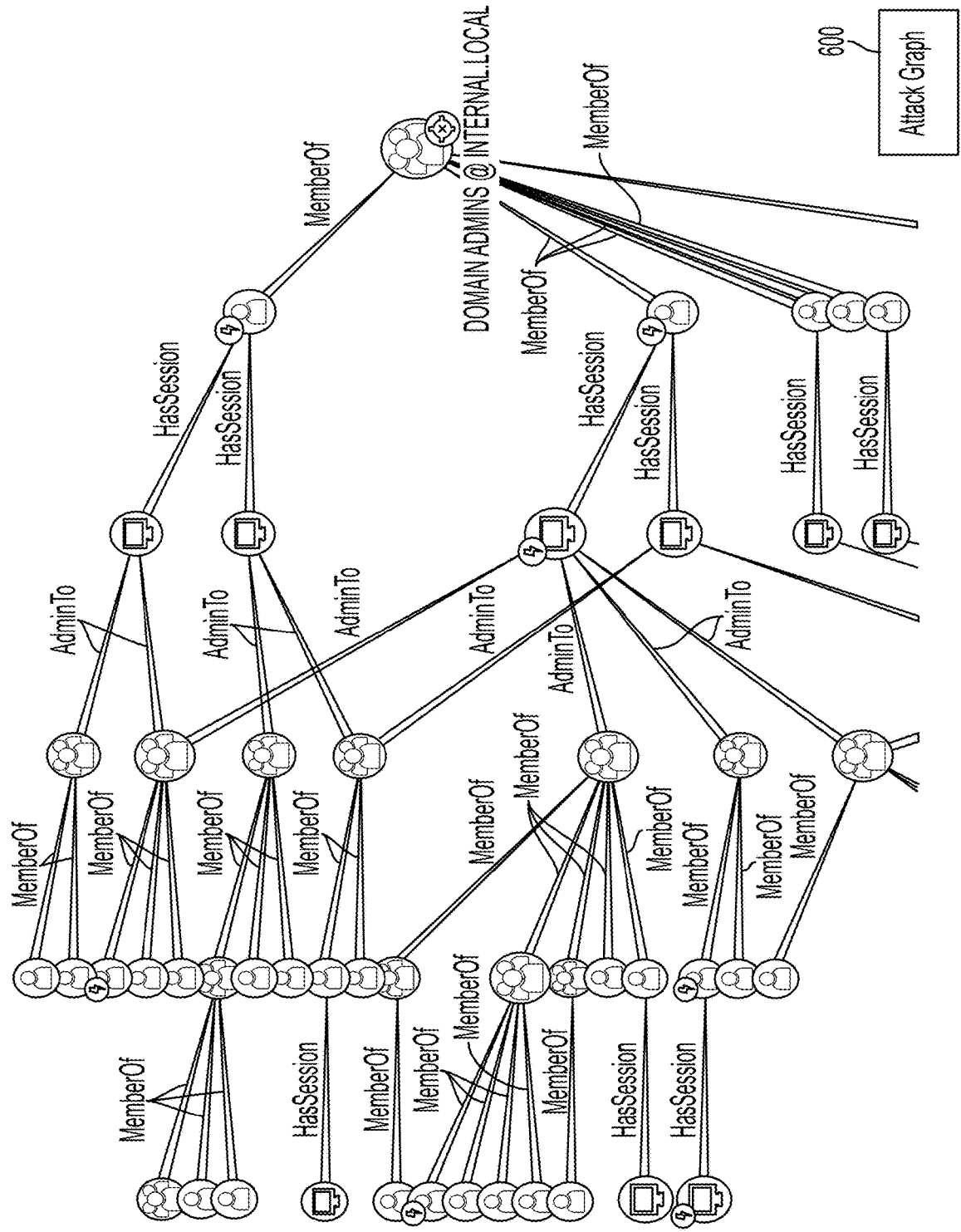
FIG. 12 illustrates an Attack Graph with greater complexity.

FIG. 12 illustrates an increasingly complex Attack Graph 600. The total number of nodes is still few compared to that of an Enterprise Infrastructure 200 and yet multiple Attack Paths 610 are present for exploitation by a malicious actor. Further complicating this for defensive security teams is the ever-changing Directory Services structure itself with new Users 621 added to new Groups 622, newly Group Policy Objects 624 created which grant new rights to other elements, or the constant access of network resources by Users 621 which creates new User Session 123 data to facilitate Credential Theft 700.

Figure 13:
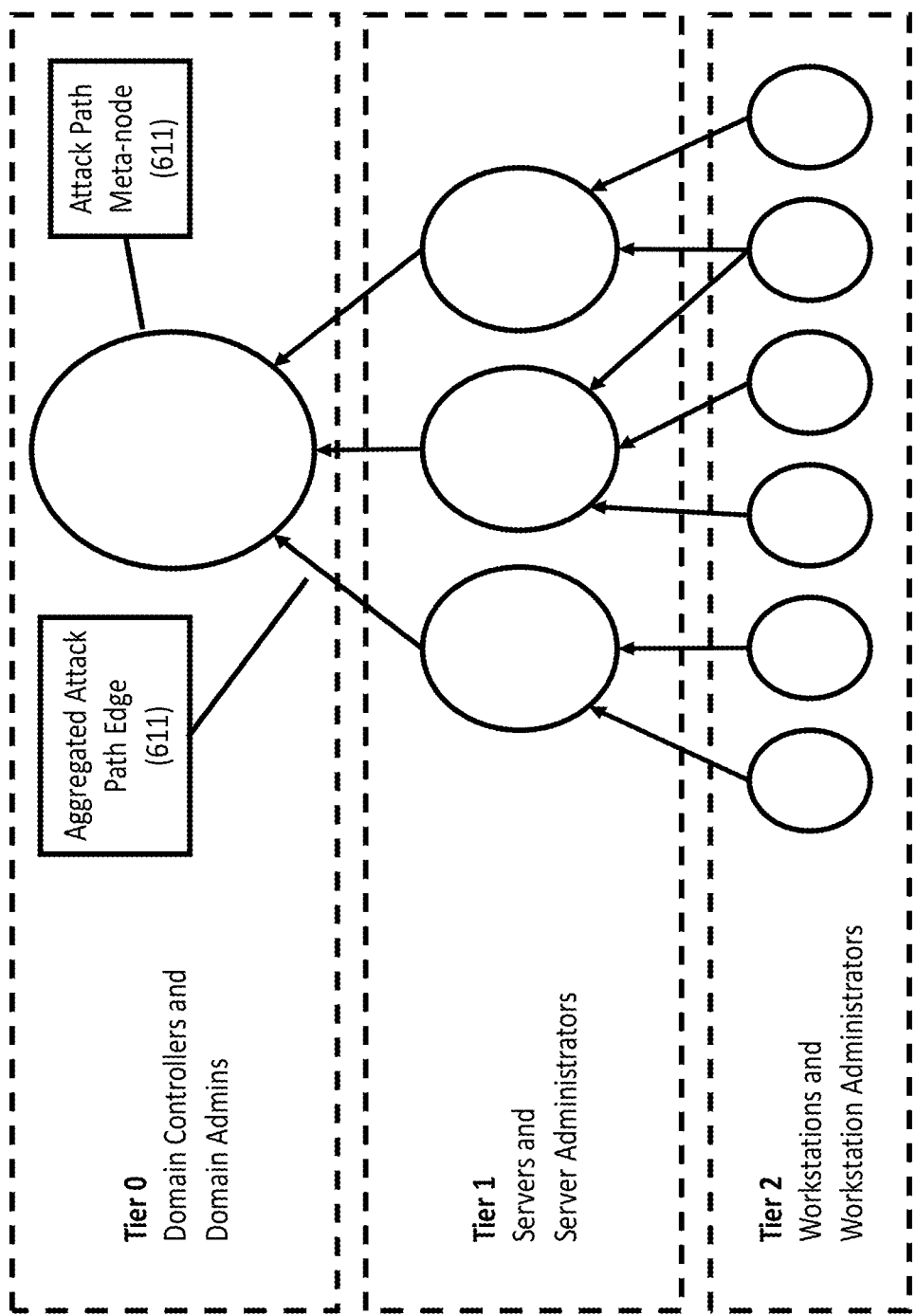
FIG. 13 illustrates the basic interface for understanding a tiered administration model for Directory Services within an environment.

FIG. 13 illustrates the basic interface for understanding a tiered administration model for Directory Services within an environment. This example has split the Directory Services elements into the logical Tiered Administration Model and presents the user with alerts by aggregating Directory Services Elements. Attack Path Elements are presented as Attack Path Meta-Nodes 612 which represent a grouping of machines, users, groups or others. These Attack Path Meta-Nodes are connected by shared Attack Path Edges 640 which are grouped alerts in the form of Attack Path Aggregated Edges 611. Each Attack Path Aggregated Edge 611 represents a common sense grouped flaw in the Directory Services architecture that allows malicious actors to move up in tier and access more sensitive information, take over the environment, or complete other Target Objectives 660.

Figure 14:
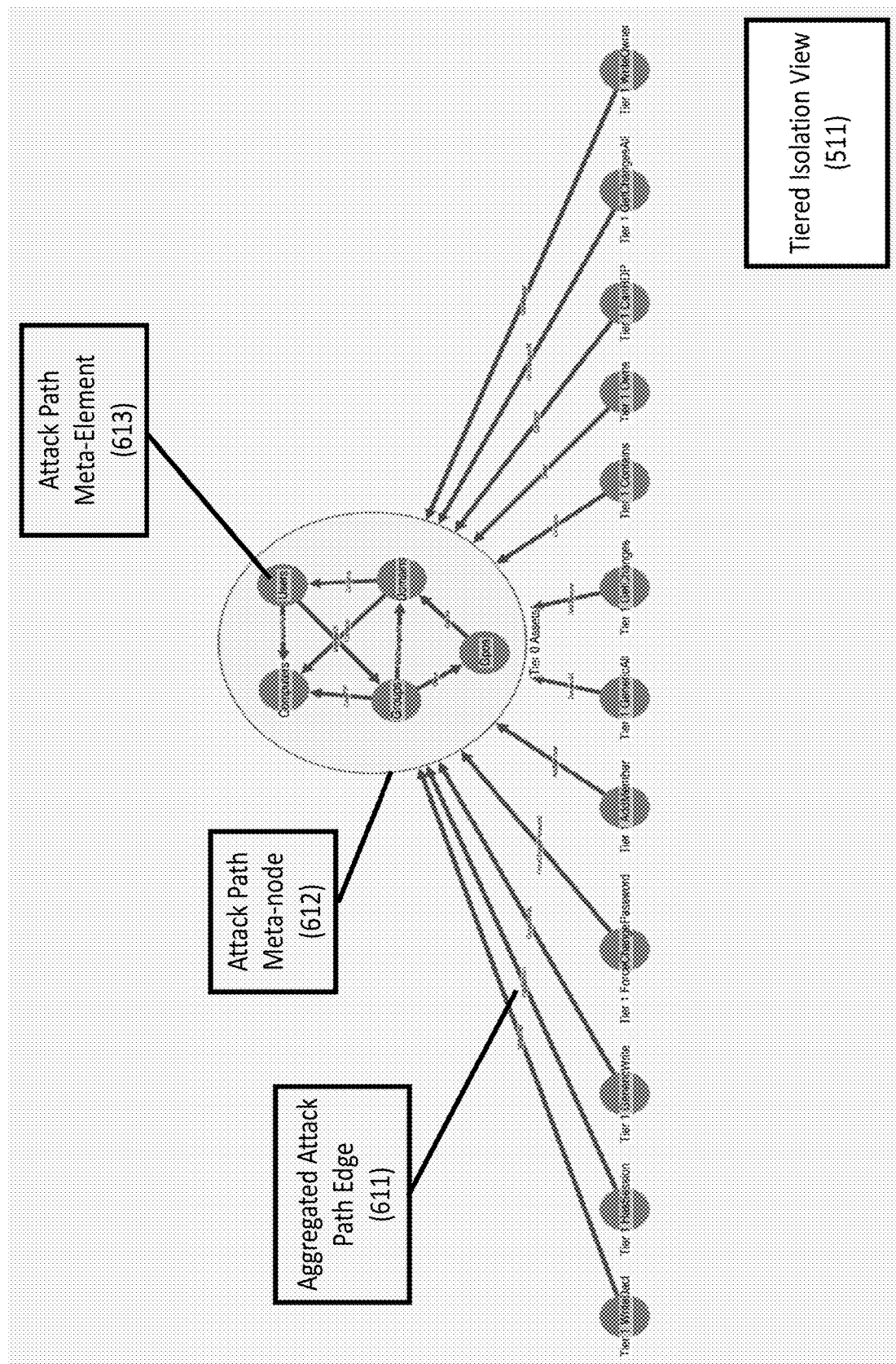
FIG. 14 illustrates the an in-depth view of the Attack Path connections between two tiers of Directory Services assets.

FIG. 14 illustrates an in-depth view of the Attack Path connections between two tiers of Directory Services assets. Here, the Attack Path Meta-Node 611 for Tier 0 assets has connections from multiple Tier 1 assets, themselves grouped again as Attack Path Meta-Nodes. These connections represent assets with the same Attack Path Edges 640. For instance, any number of machines can make up the Attack Path Meta-Node which have a HasSession 643 edge that provide a connection point, or Attack Path Aggregated Edge 611, to the Attack Path Meta-Node 612 containing all Tier zero assets. This communicates to the user that any malicious actor that has access to any machine within this specific Attack Path Meta-Node has the ability to execute Credential Theft 700 and take over the enterprise. This graphic also introduces the Attack Path Meta-Element 613 which is a sub-group within an Attack Path Meta-Node. For example, all Users 621 that are part of Tier 0 are contained within the Attack Path Meta-Element 613 User object which is contained within the Attack Path Meta-Node 612 for Tier 0.

Figure 15:
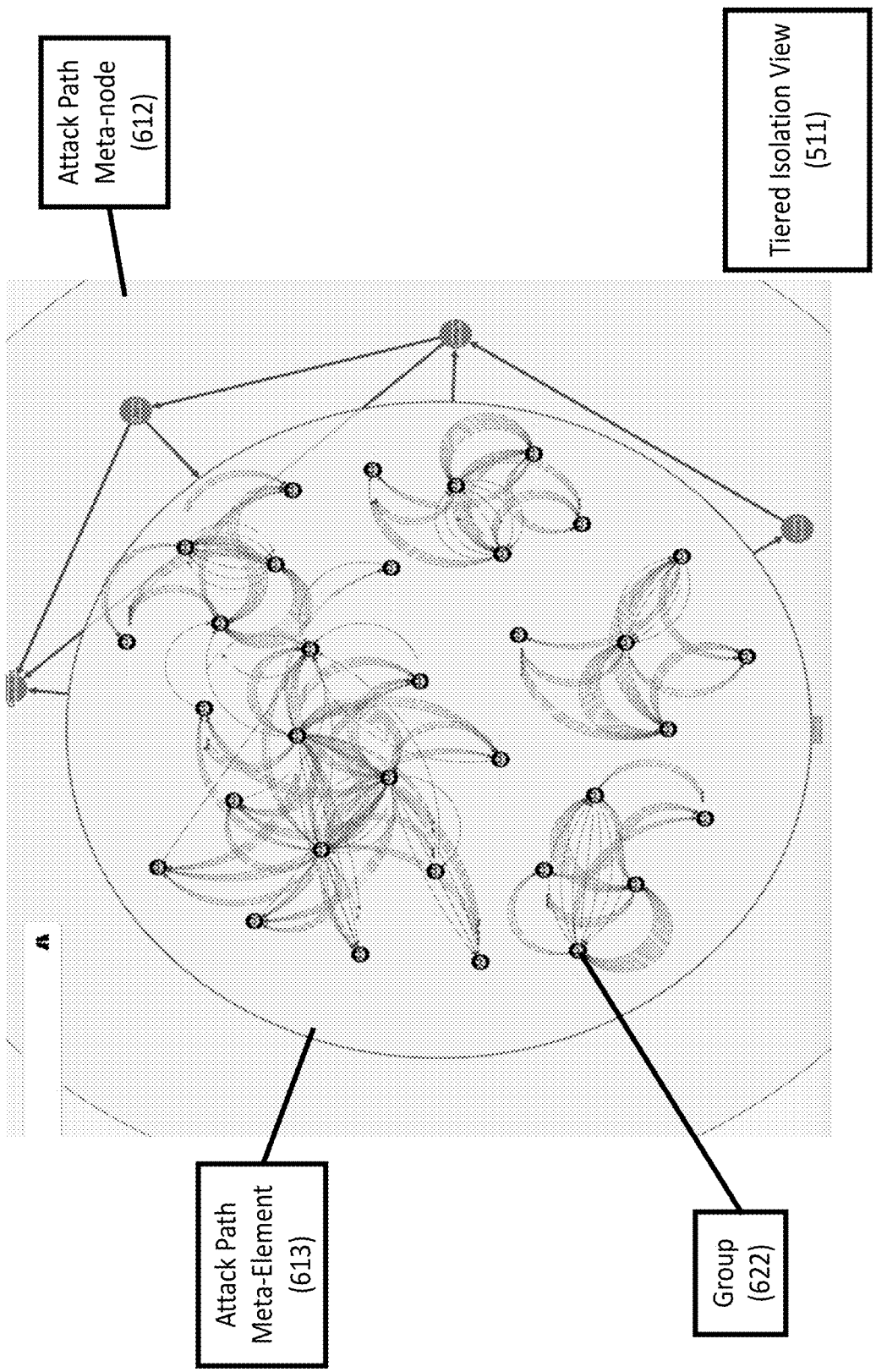
FIG. 15 expands on the Attack Path Meta-Node structure and provides a viewpoint to items contained within.

FIG. 15 expands on the Attack Path Meta-Node structure and provides a viewpoint to items contained within. Here, Attack Path Meta-Node 612 is expanded to reveal any number of Attack Path Meta-Elements 613 which themselves can contain any number of individual objects. In this specific visual, the Attack Path Meta-Element 613 for Groups 622 is expanded to showcase all contained Groups 622 and their corresponding Attack Path Edges 640.

Figure 16:
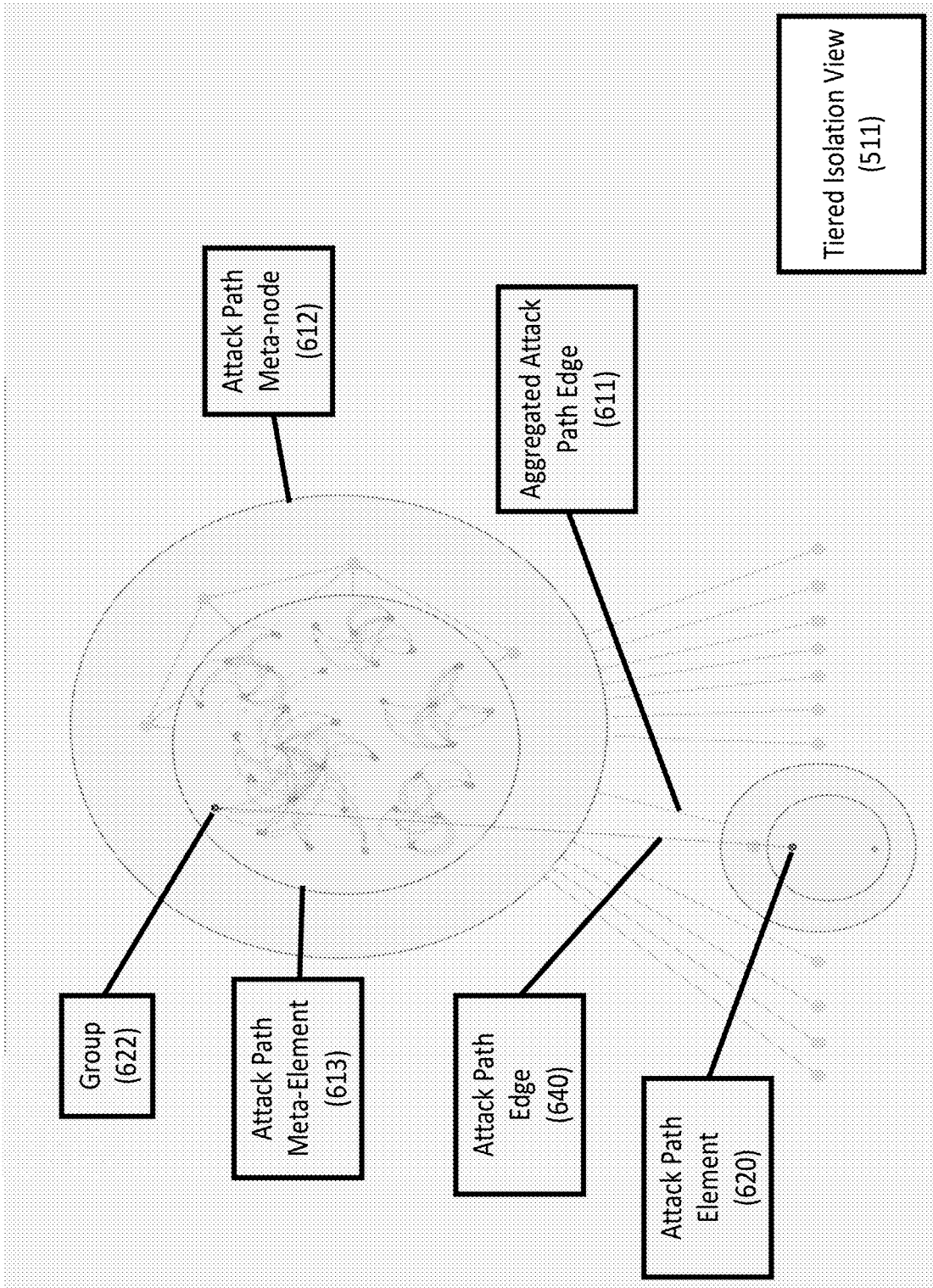
FIG. 16 illustrates an in-depth view of the objects within the Attack Graph.

FIG. 16 illustrates an in-depth view of the objects within the Attack Graph. Here, the Attack Path Meta-Node 612 for Tier 0 assets at the top of the graphic is expanded to reveal the Attack Path Meta-Elements 613 contained within. The Attack Path Meta-Element 613 for groups is expanded and an individual Group 622 is highlighted. This Group 622 is connected to another Attack Path Element 620 from the Tier 1 assets layer by an Attack Path Edge 640. This Attack Path Element 620 is itself another Group 622. This interface is allowing the user to start first with an overview of all aggregated elements before inspecting individual connections and moving to mitigation and remediation.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An apparatus for analyzing attack paths in a directory services system that manages a permission to each asset of one or more assets in an enterprise infrastructure, the apparatus comprising:
   a computer based data collector being connected to one or more assets in a data center of an infrastructure of an enterprise that continuously collects data about one or more assets;
   a graph database coupled to the computer based data collector that stores the continuously collected data for the one or more assets;
   a computer based analyzer coupled to the graph database that has a set of rules wherein each rule has a condition that is continuously tested against the continuously collected data of the one or more assets to identify an attack path and retrieves data from the graph database to identify a plurality of attack paths for the one or more assets and the directory services system in the enterprise infrastructure, wherein the set of rules further comprises a plurality of rules that identify attack path to Tier 0 assets of the one or more assets, a plurality of rules that identify Kerberos configurations that are abuseable and a plurality of rules that identify least privilege enforcement; and
   wherein the computer based data collector is in the enterprise infrastructure data center and the graph database and the computer based analyzer are in cloud separate from the enterprise infrastructure data center coupled to the computer based data collector.

2. The apparatus of claim 1 further comprising a computer based alerter coupled to the analytics unit that generates an alert for each identified attack path.

3. The apparatus of claim 2 further comprising a computer based data ingestor coupled between the computer based data collector and the graph database that converts the continuously collected data into a format for storage in the graph database.

4. The apparatus of claim 1, wherein the directory services is an Active Directory system.

5. The apparatus of claim 1, wherein the one or more assets further comprises a domain controller, a domain computer and a security information and event system.

6. The apparatus of claim 1, wherein the computer based data collector, the graph database and the computer based analyzer are in the enterprise infrastructure data center.

7. The apparatus of claim 1, wherein the computer based data collector is in the enterprise infrastructure data center and the graph database and the computer based analyzer are in an on-premise application housed in the enterprise infrastructure data center.

8. The apparatus of claim 1, wherein the plurality of rules that identify attack path to Tier 0 assets further comprises a rule that restricts Tier 0 User Account Logons, a rule that removes Users and Groups from Local Groups on Tier 0 Computers, a rule that restricts control of group policy objects that apply to Tier 0 asset and a rule that restricts control of Tier 0 objects.

9. The apparatus of claim 1, wherein the plurality of rules that identify abuseable Kerberos configurations further comprises a rule that hardens Kerberoastable User Accounts, a rule that addresses computers trusted for unconstrained delegation and a rule that restricts control of computers trusted for unconstrained delegation.

10. The apparatus of claim 1, wherein the plurality of rules that identify least privilege enforcement further comprises a rule that reduces execution rights held by large security groups and a rule that audits potential vulnerable account passwords.

11. A method for analyzing attack paths in a directory services system, the method comprising:
    continuously collecting data about one or more assets that are controlled by a directory services system, each asset being a device in an enterprise infrastructure that has its permissions determined by the directory services system;
    storing the collected data about the one or more assets in a graph database;
    performing an analysis of the collected data stored in the graph database, by continuously executing a set of rules wherein each rule has a condition that is tested against the continuously collected data of the network to identify an attack path, to identify a plurality of attack paths for the one or more assets and the directory services system in the enterprise infrastructure, wherein the set of rules further comprises a plurality of rules that identify attack path to Tier 0 assets of the one or more assets, a plurality of rules that identify Kerberos configurations that are abuseable and a plurality of rules that identify least privilege enforcement; and
    generating an alert for each identified attack path.

12. The method of claim 11, wherein the directory services is an Active Directory system.

13. The method of claim 11, wherein continuously collecting the data further comprises continuously collecting data from a domain controller, a domain computer and a security information and event system.

14. The method of claim 11 further comprising converting the data from the one or assets into a common format.

15. The method of claim 11, wherein performing the analysis further comprises testing a set of rules against the continuously collected data to identify one or more attack path.

16. The method of claim 15, wherein each rule in the set of rules has a condition that is tested against the continuously collected data of the network to identify the attack path.

17. The method of claim 16, wherein testing the set of rules further comprises continuously executing each rule in the set of rules against the continuously collected data.

18. An apparatus for analyzing attack paths in a directory services system, the apparatus comprising:

an enterprise infrastructure having a plurality of locations wherein each location has one or more assets of the enterprise infrastructure, a permission to each asset being managed by a directory services systems;

a computer based data collector housed in each location and being connected to the one or more assets in the location, the data collector continuously collecting data about one or more assets in each location;

a graph database, at different location from the plurality of locations of the enterprise infrastructure and being coupled to the each of the data collector units in each location, that stores the continuously collected data for the one or more assets; and a computer based analytics, coupled to the graph database and housed in the same location as the graph database, that further comprises a set of rules wherein each rule has a condition that is continuously tested against the continuously collected data of the network to identify an attack path and retrieves data from the graph database to identify a plurality of attack paths for the one or more assets and the directory services system in the enterprise infrastructure, wherein the set of rules further comprises a plurality of rules that identify attack path to Tier 0 assets of the one or more assets, a plurality of rules that identify Kerberos configurations that are abuseable and a plurality of rules that identify least privilege enforcement.

19. The apparatus of claim 18 further comprising a computer based alerter coupled to the computer based analytics that generates an alert for each identified attack path.

20. The apparatus of claim 19 further comprising a computer based data ingestor coupled between the computer based data collector and the graph database that converts the continuously collected data into a format for storage in the graph database.

21. The apparatus of claim 18 wherein the directory services is an Active Directory system.

22. The apparatus of claim 18, wherein the one or more assets further comprises a domain controller, a domain computer and a security information and event system.

23. The apparatus of claim 18, wherein the computer based analytics further comprises a set of rules wherein each rule has a condition that is tested against the continuously collected data of the network to identify an attack path.

24. The apparatus of claim 23, wherein the computer based analytics continuously executes each rule in the set of rules.

* * * * *